United States Patent
Kazamaki et al.

(10) Patent No.: US 8,553,015 B2
(45) Date of Patent: Oct. 8, 2013

(54) ELECTRONIC DEVICE AND INFORMATION PROCESSING METHOD

(75) Inventors: Takashi Kazamaki, Osaka (JP); Keisuke Tanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 90 days.

(21) Appl. No.: 13/144,423

(22) PCT Filed: Dec. 14, 2009

(86) PCT No.: PCT/JP2009/070808
§ 371 (c)(1),
(2), (4) Date: Jul. 13, 2011

(87) PCT Pub. No.: WO2010/082421
PCT Pub. Date: Jul. 22, 2010

(65) Prior Publication Data
US 2012/0019487 A1    Jan. 26, 2012

(30) Foreign Application Priority Data

Jan. 14, 2009   (JP) ................................. 2009-005965

(51) Int. Cl.
*G06F 3/033* (2013.01)
(52) U.S. Cl.
USPC ......................................... 345/179; 345/180
(58) Field of Classification Search
USPC ........................... 345/173, 174, 175, 179, 180
See application file for complete search history.

(56) References Cited

U.S. PATENT DOCUMENTS

| | | | |
|---|---|---|---|
| 7,259,753 B2 * | 8/2007 | Keely et al. .................... | 345/179 |
| 2001/0056442 A1 | 12/2001 | Dresevic et al. | |
| 2002/0013795 A1 | 1/2002 | Dresevie et al. | |
| 2002/0049787 A1 | 4/2002 | Keely et al. | |
| 2002/0049796 A1 | 4/2002 | Dresevic et al. | |
| 2005/0024346 A1 * | 2/2005 | Dupraz et al. ................ | 345/179 |
| 2006/0109263 A1 * | 5/2006 | Wang et al. .................... | 345/179 |

FOREIGN PATENT DOCUMENTS

| | | |
|---|---|---|
| JP | 10-312257 A | 11/1998 |
| JP | 2002-82937 A | 3/2002 |
| JP | 2002-207754 A | 7/2002 |
| JP | 2004-328451 A | 11/2004 |
| JP | 2006-58917 A | 3/2006 |

* cited by examiner

*Primary Examiner* — Joseph Feild
*Assistant Examiner* — Andrew Sasinowski
(74) *Attorney, Agent, or Firm* — Birch, Stewart, Kolasch & Birch, LLP

(57) ABSTRACT

There are provided an electronic device that enables a user to perform handwriting input in one-subject display of a content and to call, from an item, a one-subject display screen of the item to which handwriting is added, and a control method of the electronic device. Electronic device includes input keys, a touch panel, a display, a ROM storing a content database, a hard disk, and a CPU. Display is a sensor-incorporated display that can accept the handwriting input. CPU searches the item from content database, based on an instruction. CPU displays an item display screen based on the searched item on display. CPU displays, on display, handwritten expression corresponding to the handwriting input so as to superimpose the same on the item display screen. CPU stores the handwritten expression in hard disk as handwritten memo data. When the item is selected, based on the instruction, CPU displays, on display, a screen in which the item display screen corresponding to the selected item, and the handwritten expression stored in the storage are superimposed.

12 Claims, 27 Drawing Sheets

FIG.7

CONTENT 1 DESCRIPTION INFORMATION EXAMPLE

No1 (1) ONE OF JAPANESE SYLLABLES AND ONE OF KANA (BREAK)(2) LOCATED IN SECOND ROW OF FIRST COLUMN IN KATAKANA SYLLABARY

No2 ADVERB MEANING "THAT WAY"

No3 FEELING OF AFFECTION TO PERSON

No4 SMALL MONKEY OF FAMILY DAUBENTONIIDAE IN ORDER PRIMATES

No5 TO HAPPEN TO MEET. TO MEET
 :
 :

FIG.8

CONTENT 2 DESCRIPTION INFORMATION EXAMPLE

No1 CONGRATULATIONS ON THE BIRTH OF YOUR NEW BABY. I WISH THE BEST FOR ALL OF YOU.

No2 CONGRATULATIONS ON YOUR WEDDING. I AM LOOKING FORWARD TO YOUR PROUD MOMENT.

No3 YOU ARE HAPPY TO HAVE A JOB. KEEP IT UP.
 :

FIG.9

CONTENT NAME DATABASE

CONTENT 1 NAME INFORMATION
"JAPANESE DICTIONARY"
CONTENT 2 NAME INFORMATION
"EXAMPLE SENTENCE COLLECTION"
CONTENT 3 NAME INFORMATION
"ENGLISH-JAPANESE DICTIONARY"
 :

| ○ HANDWRITTEN MEMORIZATION MEMO | NAME ORDER | DATE ORDER | |
|---|---|---|---|
| [1] HANDWRITTEN MEMO 001 | | 2008/12/03 | 7:16 PM |
| [2] ENGLISH-JAPANESE DICTIONARY : among | | 2008/12/03 | 7:15 PM |
| [3] ENGLISH-JAPANESE DICTIONARY : among | | 2008/12/03 | 7:12 PM |
| [4] 《NEWLY CREATE A HANDWRITTEN MEMO》 | | | |

[PREVIEW] ↓

1920

○ HANDWRITTEN MEMORIZATION MEMO | NAME ORDER | DATE ORDER

[1] HANDWRITTEN MEMO 001
[2] ENGLISH-JAPANE···
[3] ENGLISH-JAPANE···
[4] 《NEWLY CREATE ···

6/30
MATH T 1921　　1922

ELECTRONIC DEVICE AND INFORMATION PROCESSING METHOD

TECHNICAL FIELD

The present invention relates to an electronic device and an information processing method using the electronic device. Particularly, the present invention relates to an electronic device having an electronic dictionary function, and an information processing method using the same.

BACKGROUND ART

In recent years, devices each having an electronic dictionary and an electronic dictionary application function have been widely prevalent. The electronic dictionary or an electronic dictionary application stores a content, and based on a search instruction from a user, a selected item is displayed from the content such as dictionary data registered in advance. Hereinafter, the electronic dictionary and the device having the electronic dictionary application function will be collectively referred to as an "electronic dictionary".

Currently, many of the electronic dictionaries have had not only a function of searching an item but also various additional functions. For example, an electronic dictionary having a vocabulary notebook function has been known. The vocabulary notebook function is a function of registering an index word of the dictionary specified by the user, and all or part of description information corresponding to the index word. Also, there is an electronic dictionary having a marker function. The marker function is a function of performing processing of changing a display form such as a half-tone dot meshing and underline to a display character string specified by the user.

Moreover, in Japanese Patent Laying-Open No. 2002-207754 (Patent Literature 1), there is disclosed an electronic dictionary system that registers supplementary data such as an image and handwriting data in association with each index word of the dictionary. In this system, an icon indicating that the supplementary data is registered is displayed, when the index word with the corresponding supplementary data registered is specified. Pressing the icon allows this system to display the registered supplementary data. Furthermore, this system sequentially outputs the supplementary data registered corresponding to the index words, and also displays the index word corresponding to the selected supplementary data, when one piece of the outputted supplementary data is selected.

In many of the devices, a handwriting input device has been included. In Japanese Patent Laying-Open No. 10-312257 (Patent Literature 2), there is disclosed a portable information collecting apparatus including a CCD camera, an input-display incorporated tablet and a flash memory. When an image is taken by the CCD camera, this apparatus displays the taken image on a screen of the tablet with a blank space. The user performs handwriting input on the screen on which the taken image is displayed. The apparatus stores the taken image data, and ink data of a handwritten character, line drawing and the like at an address of the flash memory associated with one another. The apparatus overwrites the ink data associated with the image data in the image data to redisplay on the tablet.

An image forming apparatus disclosed in Japanese Patent Laying-Open No. 2004-328451 (Patent Literature 3) displays image data obtained from a scanner or the like, and handwriting data in a superimposed manner on a display unit. Moreover, the image forming apparatus outputs synthetic data, in which the image data and the handwriting data are synthesized, to another information processing apparatus through a fax, an electronic mail or the like.

CITATION LIST

Patent Literature

PTL 1: Japanese Patent Laying-Open No. 2002-207754
PTL 2: Japanese Patent Laying-Open No. 10-312257
PTL 3: Japanese Patent Laying-Open No. 2004-328451

SUMMARY OF INVENTION

Technical Problem

In the conventional electronic dictionary, the user cannot directly add information to the content as in a paper dictionary. For example, the user cannot perform free writing such as circling an important portion to a screen describing one item (an index word) in the dictionary (hereinafter, referred to as a "one-subject display screen"). In the electronic dictionary system according to Patent Document 1, although the supplementary data is associated with the one-subject display screen, the writing in the one-subject display screen itself is not performed.

In the apparatuses according Patent Documents 2 and 3, the image combined with the handwriting is created to the image acquired in the camera or the like. However, if these apparatuses are each simply applied to the electronic dictionary, the handwriting in the one-subject display screen cannot be associated with the item of the content stored in the apparatus in advance. Accordingly, in the electronic dictionary to which the techniques of these Documents are each simply applied, the one-subject display screen of the item subjected to the handwriting cannot be called from the item of the dictionary, which makes it clumsy to use.

The present invention is achieved to solve the above-described problems, and an object thereof is to provide an electronic device that enables a user to perform handwriting input in one-subject display of a content, and to call, from an item, a one-subject display screen of the item with handwriting added, and a control method of the electronic device.

Solution to Problem

According to one aspect of the present invention, there is provided an electronic device including a display and an input unit for accepting an external instruction, the input unit including a handwriting input unit for accepting handwriting input, the electronic device including a storage for storing a content including a plurality of items, a search unit for searching the item based on the instruction, an item display unit for displaying an item display screen based on the searched item on the display, a writing unit for displaying handwritten expression corresponding to the handwriting input on the display so as to superimpose the handwritten expression on the item display screen, a register that stores the handwritten expression in the storage, and a calling unit for displaying the item display screen corresponding to the selected item and the handwritten expression stored in the storage on the display, when the item is selected based on the instruction.

According to another aspect of the present invention, there is provided an electronic device including a display and an input unit for accepting an external instruction, the input unit including a handwriting input unit for accepting handwriting input, the electronic device further including a storage for storing a content including a plurality of items, a search unit for searching the item based on the instruction, an item display unit for displaying an item display screen based on the searched item on the display, a writing unit for displaying handwritten expression corresponding to the handwriting input on the display so as to superimpose the handwritten expression on the item display screen, a register for storing the handwritten expression in the storage in association with identification information of the item corresponding to the item display screen on which the handwritten expression is superimposed, and a calling unit for displaying the identification information corresponding to the handwritten expression on the display in a selectable manner, and displays, on the display, the item display screen corresponding to the selected identification information and the handwritten expression stored in the storage, when the identification information is selected, based on the instruction.

Preferably, upon accepting the instruction to store the handwritten expression in the storage, the register captures a screen displayed on the display, and stores the captured screen in the storage, and the calling unit displays the captured screen on the display, when the identification information is selected.

More preferably, the writing unit causes the display to fixedly display the item display screen while the handwritten expression is displayed on the display.

More preferably, the register further stores the item display screen in the storage in association with the searched item at the time of accepting the instruction, and the calling unit displays, on the display, the captured screen and the item display screen in a superposed manner, when the identification information is selected, and the electronic device further includes an editor that edits the captured screen, based on the instruction.

Preferably, the identification information includes an index given to the item.

Preferably, the identification information includes a content name given to the content including the item.

Preferably, the electronic device further includes a clock unit for measuring a time, and the register stores the time as the identification information in the storage in storing the handwritten expression in the storage.

Preferably, the calling unit displays, on the display, a preview of the handwritten expression in association with the identification information associated with the handwritten expression.

According to still another aspect of the present invention, there is provided an information processing method using an electronic device having a display, a handwriting input unit for accepting handwriting input, a storage for storing a content including a plurality of items, and an arithmetic unit, the method including the steps of causing the arithmetic unit to search the item, causing the display to display an item display screen based on the searched item, causing the display to display handwritten expression corresponding to the handwriting input so as to superimpose the handwritten expression on the item display screen, storing the handwritten expression in the storage, and causing the display to display the item display screen corresponding to the selected item and the handwritten expression stored in the storage.

According to still another aspect of the present invention, there is provided an information processing method using an electronic device having a display, a handwriting input unit for accepting handwriting input, a storage for storing a content including a plurality of items, and an arithmetic unit, the method including the steps of causing the arithmetic unit to search the item, causing the display to display an item display screen based on the searched item, causing the display to display handwritten expression corresponding to the handwriting input so as to superimpose the handwritten expression on the item display screen, storing the handwritten expression in the storage in association with identification information of the item corresponding to the item display screen on which the handwritten expression is superimposed, causing the display to display the identification information associated with the handwritten expression in a selectable manner, and displaying, on the display, the item display screen corresponding to the selected identification information, and the handwritten expression stored in the storage, when the identification information is selected, based on an instruction.

Advantageous Effects of Invention

The electronic device according to the present invention can accept the handwriting input, and displays the handwritten expression corresponding to the handwriting input so as to superimpose the handwritten expression on the item display screen. Moreover, the electronic device stores the handwritten expression performed in the item display screen in the storage device. Furthermore, the electronic device displays, on the display, the item display screen selected based on the instruction, and the handwritten expression to the item display screen. Therefore, according to the electronic device according to the present invention or the information processing method using the electronic device, the user can perform the handwriting input in the one-subject display of the content, and call the one-subject display screen with the handwriting added.

BRIEF DESCRIPTION OF DRAWINGS

FIG. 7 is a diagram showing one example of description information.

FIG. 8 is a diagram showing one example of description information.

FIG. 9 is a diagram showing one example of a content name database.

FIG. 19 is a diagram for describing operation of the electronic device relating to preview display.

DESCRIPTION OF EMBODIMENTS

First Embodiment

<Hardware Configuration>

Figure 1:
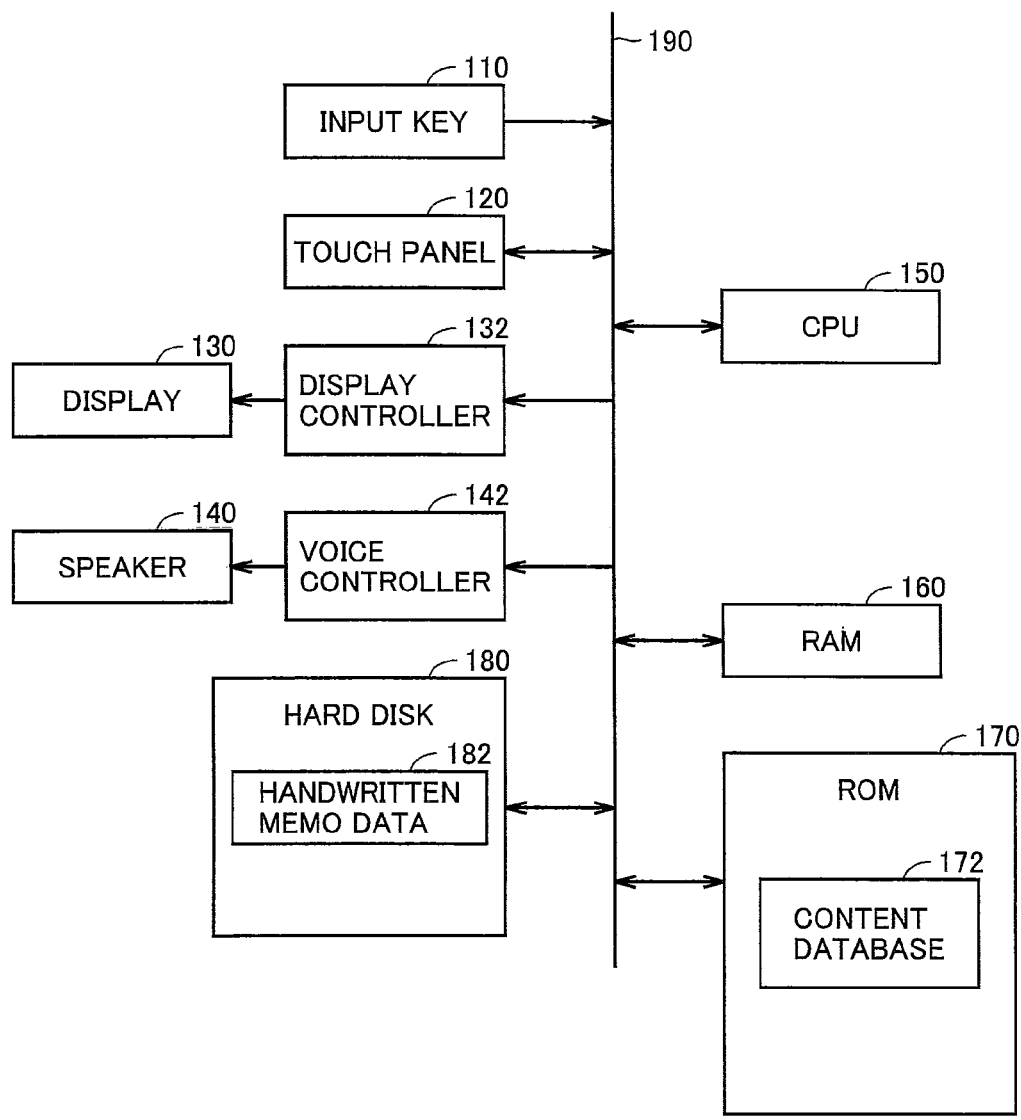
FIG. 1 is a diagram showing a hardware configuration of an electronic device in a block diagram form.

Referring to FIG. 1, a hardware configuration of an electronic device 100 according to the present embodiment will be described. FIG. 1 is a diagram showing the hardware configuration of electronic device 100 according to the present embodiment in a block diagram form.

In the present embodiment, a description will be given on the assumption that electronic device 100 is a so-called electronic dictionary, that is, a device in which an electronic dictionary function of displaying an item display screen corresponding to a searched item is designed as a main function. However, electronic device 100 is not limited to the electronic dictionary, but only needs to be a device having the electronic dictionary function and capable of accepting handwriting input. Electronic device 100 may be a portable terminal such as a portable telephone and a PDA (Personal Digital Assistant). Alternatively, electronic device 100 may be a personal computer. Moreover, electronic device 100 may be realized by a system including a terminal that can accept handwriting input and has a display apparatus, and a server that performs search processing of an item in response to an instruction inputted to the terminal, and the like.

Referring to FIG. 1, electronic device 100 includes input keys 110, a touch panel 120, a display 130, a display controller 132, speakers 140, a voice controller 142, a CPU (Central Processing Unit) 150, a RAM (Random Access Memory) 160, a ROM (Read Only Memory) 170, and a hard disk 180.

Upon being externally pressed, input keys 110 each output a signal in accordance with relevant input key 110. A user inputs a keyword to be used for item search through input keys 110.

Touch panel 120 detects touching of an object (a stylus pen or the like) to a surface of touch panel 120 to output a signal in accordance with a touch portion between touch panel 120 and the object. Moreover, touch panel 120 is installed so as to overlap a display panel to display a screen in accordance with an operation state of electronic device 100. However, in the following description, displaying a screen on the display panel may be referred to as displaying a screen on touch panel 120. As touch panel 120, a liquid crystal panel with a built-in optical sensor can also be used. In this case, the display panel is unnecessary. Moreover, touch panel 120 may accept a keyword input by performing character recognition from input strokes by the stylus pen through a handwritten-character recognition program not shown, or the like.

With the keyword input, electronic device 100 may accept the keyword input by voice recognition through a voice input unit (a microphone or the like) not shown and a voice recognition program.

Display 130 displays a screen based on data inside electronic device 100. Display controller 132 controls operation of display 130. In the present embodiment, display 130 can display a plurality of colors.

Moreover, display 130 is a sensor-incorporated display capable of detecting touching of an object (a stylus pen) to a surface of display 130. Display 130 displays a trajectory of a touch portion. That is, display 130 displays handwritten expression corresponding to handwriting input performed to the surface of display 130.

As display 130, for example, a display in which a display panel such as a liquid crystal panel and an LED (Light-Emitting Diode) and a touch panel overlap each other, a liquid crystal panel with a built-in optical sensor, or the like can be used.

Speakers 140 output voice based on data inside electronic device 100. Voice controller 142 controls operation of speakers 140.

CPU 150 executes arithmetic operation for controlling the operation of electronic device 100. RAM 160 stores temporary information produced when CPU 150 performs processing.

ROM 170 stores information such as a content database 172. Content database 172 is information of a content of a dictionary or the like stored in ROM 170 in advance. Details of content database 172 will be described later. In place of ROM 170, another storage apparatus such as a flash memory may be used.

Hard disk 180 stores information such as handwritten memo data 182. In handwritten memo data 182, handwriting performed in a one-subject display screen of an item of the content, and the item are associated with each other to be registered. Details of handwritten memo data 182 will be described later. Hard disk 180 is one example of the storage apparatus capable of reading and writing data. In place of hard disk 180, a flash memory or the like may be used.

Figure 2:
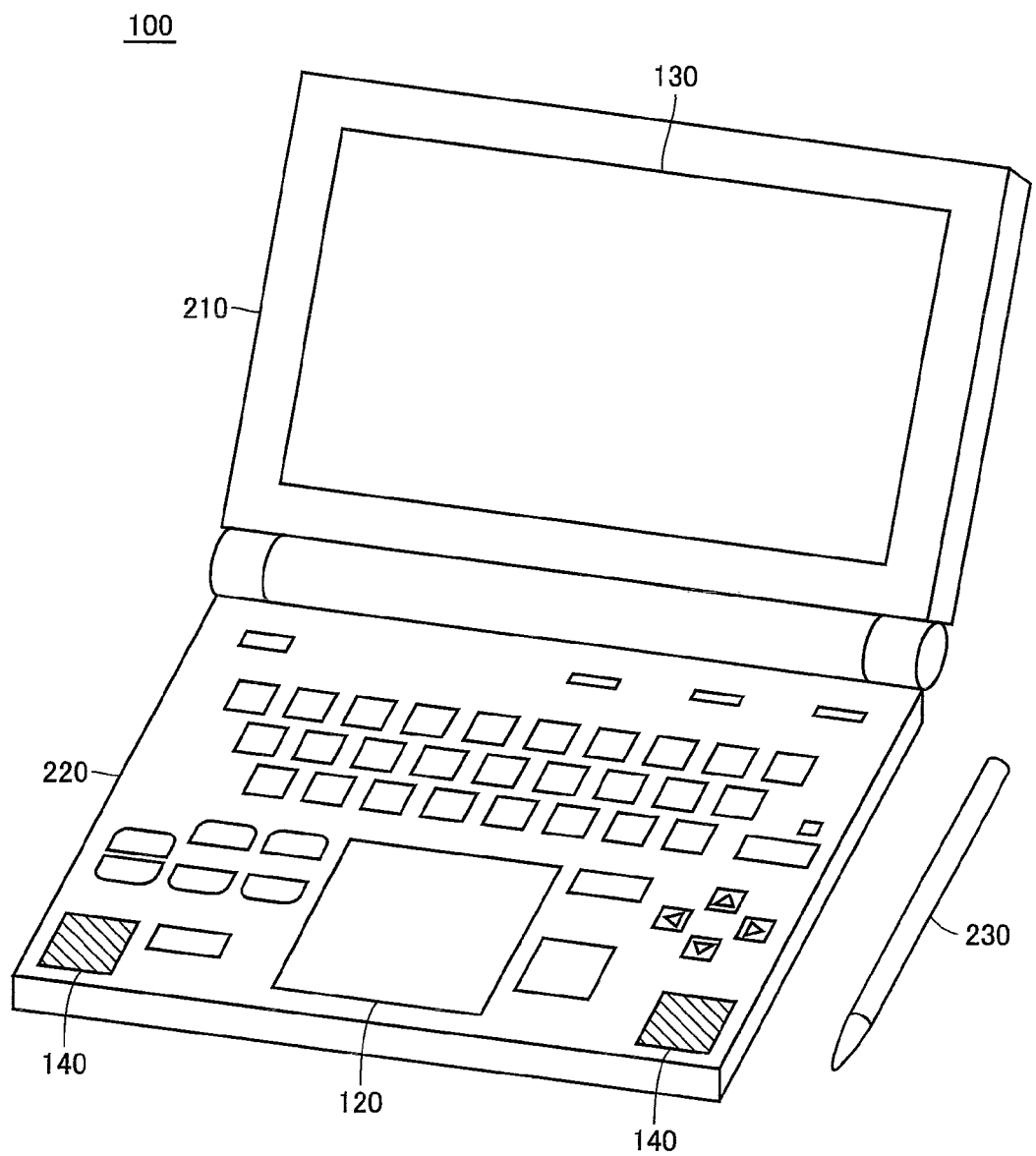
FIG. 2 is a perspective diagram of the electronic device.

FIG. 2 is a perspective diagram of electronic device 100. However, FIG. 2 shows one example of an exterior appearance of electronic device 100, and the exterior appearance of electronic device 100 is not limited to that shown in FIG. 2.

Referring to FIG. 2, electronic device 100 includes a first casing 210, a second casing 220, and a stylus pen 230. In first casing 210, display 130 is arranged. In second casing 210, touch panel 120, speakers 140 and input keys 110 are arranged. First casing 210 and second casing 220 are connected openably and closably.

Figure 3:
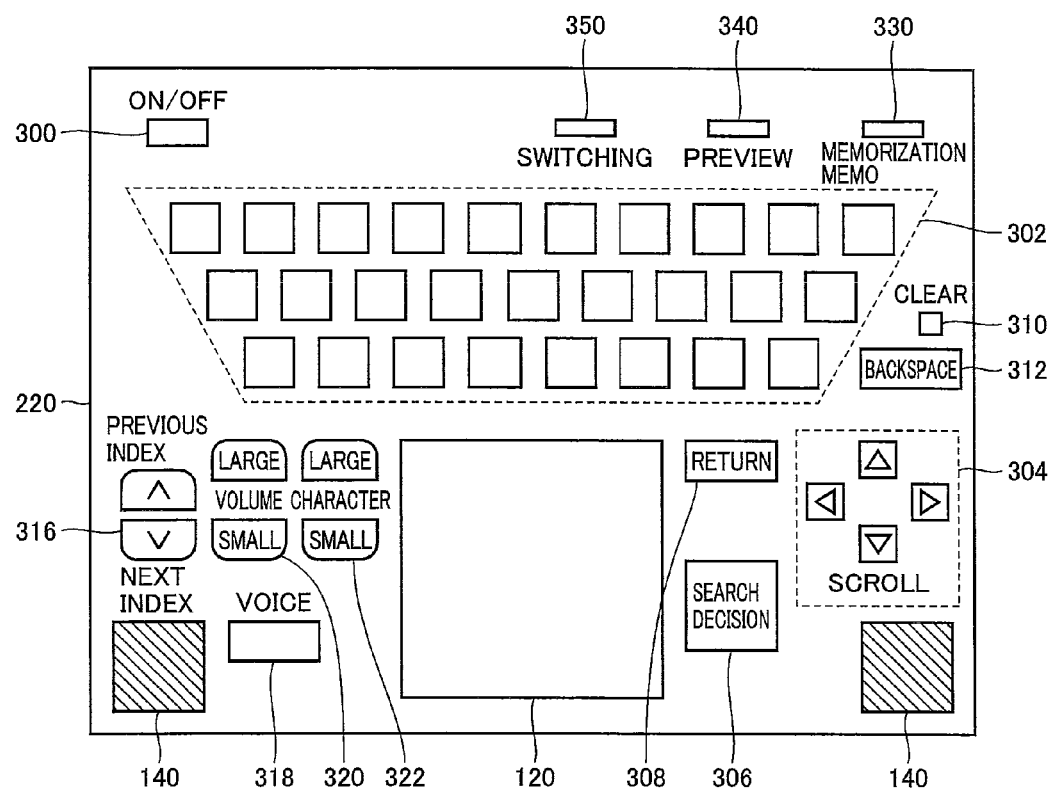
FIG. 3 is a diagram showing a component arrangement in a second casing.

Referring to FIG. 3, a component arrangement in second casing 220 will be described. FIG. 3 is a diagram showing the component arrangement in second casing 220. The arrangement of the respective keys, touch panel 120 and speakers 140 of electronic device 100 shown in FIG. 3 are one example, and the arrangement of these is not limited to that shown in FIG. 3.

In second casing 220, touch panel 120, speakers 140 and the various keys are arranged. The keys arranged in second casing 220 include a power key 300, character keys 302, direction keys 304, a search/decision key 306, a return key 308, a clear key 310, a backspace key 312, index word movement keys 316, a voice key 318, volume keys 320, character size keys 322, a memorization memo key 330, a preview key 340, and a switching key 350.

Here, the several keys will be described. Character keys 302 are used for input of characters. Direction keys 304 are used for movement of a cursor inside a screen displayed on display 130. Voice key 318, when being pressed in the case where the item displayed on display 130 includes voice data, outputs a voice to speakers 140. Volume keys 320 and character size keys 322 are utilized for adjustment of a volume and a character size inside the screen. The keys not described here will be described below as needed.

<Functional Configuration>

Figure 4:
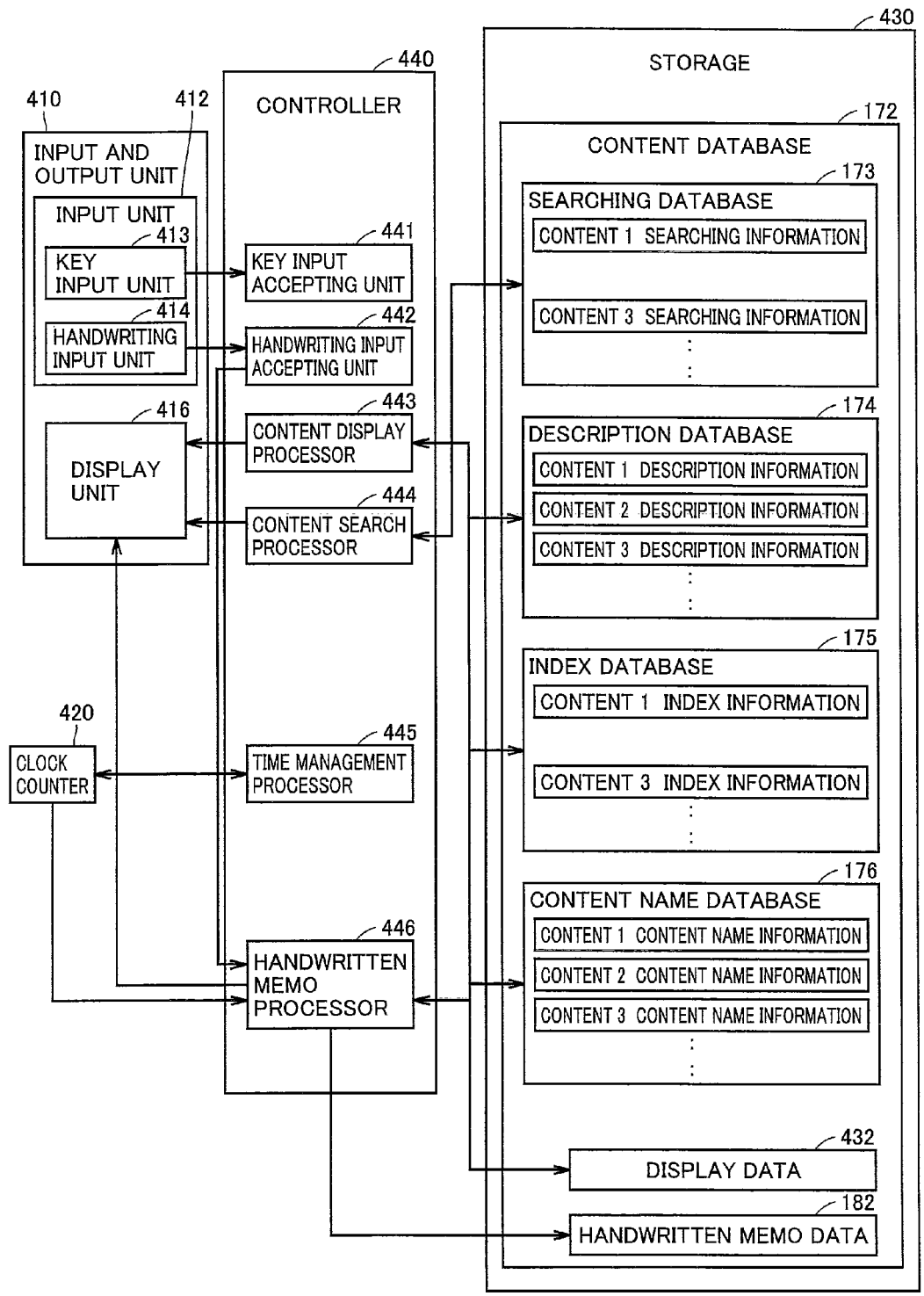
FIG. 4 is a diagram showing a functional configuration of the electronic device in a block diagram form.

Referring to FIG. 4, a functional configuration of electronic device 100 will be described. FIG. 4 is a diagram showing the functional configuration of electronic device 100 in a block diagram form. Electronic device 100 includes an input and output unit 410, a clock counter 420, a storage 430 and a controller 440. Input and output unit 410 includes an input unit 412 and a display unit 416.

Input unit 412 accepts an external instruction to electronic device 100. Display unit 416 displays information inside electronic device 100 to the outside.

Input unit 412 includes a key input unit 413, and a handwriting input unit 414. Key input unit 413 accepts key input. Handwriting input unit 414 accepts handwriting input, that is, a signal indicating a touch position of an external object to the surface of display 130. In the present embodiment, display 130 is of a sensor incorporated type, and functions as handwriting input unit 414. However, the function of handwriting input unit 414 may be realized by another apparatus such as a mouth and a tablet.

Clock counter 420 has current time information. Moreover, in accordance with a request from the other unit, clock counter 420 gives the time information to the unit that issued the request.

Storage 430 stores the information. In the present embodiment, RAM 160, ROM 170 and hard disk 180 correspond to storage 430. Storage 430 stores content database 172, display data 432 which serves as a basis of screens displayed on display unit 416, and handwritten memo data 182.

Content database 172 includes a searching database 173, a description database 174, an index database 175, and a content name database 176. In the present embodiment, storage 430 stores data on a plurality of types of contents (a content 1, a content 2, a content 3 . . . ).

Searching database 173 is made up of searching information of the respective contents. The searching information indicates correspondence relationships between the key input and the items included in the contents. The searching information is used when the user searches the item of the content. There may be a content without the searching information. For example, in an example sentence collection to cause the user to select a sentence example from a plurality of sentence examples, or the like, the searching information is unnecessary. In the case of the present embodiment, content 2 is the example sentence collection, and the searching information of content 2 is absent.

Description database 174 is made up of description information of the respective contents. The description information is information describing the respective items of the contents. In the case of a dictionary or an encyclopedia, detailed information of the index words corresponds to the description information. The description information is data that the user searches using electronic device 100, and exists for all the contents.

Index database 175 is made up of index information of the respective contents. The index information is given to the respective items of the contents, and is character strings indicating the contents of the respective items. In the case of the dictionary or the encyclopedia, the index words correspond to index information. The index information is used for the user to search a desired item from the content of the dictionary, the encyclopedia or the like. There may be a content without the index information. For example, the index information is not given to the example sentence collection or the like. In the case of the present embodiment, the index information of content 2 is absent.

Content name database 176 is made up of content name information of the respective contents. The content name information is character strings to identify the respective contents.

In the present embodiment, the index information and the content name information are used to identify the handwritten memo performed to the item included in the contents. That is, electronic device 100 stores the index information and the content name information in storage 430 as handwritten memo data 182 in association with the registered handwritten memo. Electronic device 100 displays, on display 130, a list of the index information and the content name information stored in association with handwritten memo data 182. This list display will be specifically described later.

Referring to FIGS. 5 to 9, the searching information, the description information, the index information, and the content name information will be specifically described.

Figure 5:
FIG. 5 is a diagram showing one example of searching information.

FIG. 5 is a diagram showing one example of the searching information of content 1. In the present embodiment, content 1 is assumed to be a Japanese dictionary. In FIG. 5, numeric characters on the left side (No 1, No 2, . . . ) are identification information assigned to the respective items of the content. Characters on the right side W51 to W55 are the key input corresponding to the items. For example, when character W52 is key-inputted, electronic device 100 considers item No 2 to have been selected. Characters "W51 to W55 are Japanese. More particularly, characters W51 to W55 are hiragana.

Figure 6:
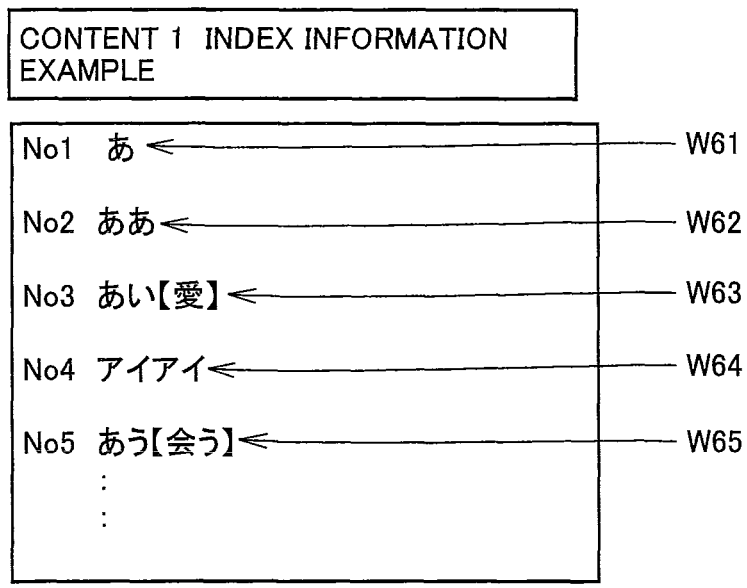
FIG. 6 is a diagram showing one example of index information.

FIG. 6 is a diagram showing one example of the index information of content 1. The index information (characters W61 to W65) is stored in storage 430 in association with the identification information. Electronic device 100 displays the respective pieces of index information on display 130, and considers the item corresponding to the index information selected from the displayed index information to have been selected. Characters W61 to W65 are Japanese. Characters W61, W62 are hiragana. Character W64 is katakana. Characters W63, 65 each include hiragana and kanji.

FIG. 7 is a diagram showing one example of the description information of content 1. Character strings on the left side in FIG. 7 are the description information. The description information is stored in storage 430 in association with the identification information. When the item is selected, electronic device 100 displays the description information corresponding to the selected item on display 130. For example, when item No 3 is selected, electronic device 100 displays "feeling of affection toward a person" on display 130. Since characters W61 to W65 are Japanese, the description information is originally displayed in Japanese. However, in FIG. 7, in order to make understanding easy, the descriptions of characters W61 to W65 are expressed in a different language from Japanese.

FIG. 8 is a diagram showing one example of the description information of content 2. This is shown as an example of the description information of the content not having the searching information and the index information. The description information in FIG. 8 may be Japanese.

FIG. 9 is a diagram showing one example of the content name database. Referring to FIG. 9, the name information of content 1, content 2, content 3 is the "Japanese dictionary", the "example sentence collection" and an "English-Japanese dictionary", respectively.

Referring back to FIG. 4, controller 440 controls operations of the respective units of electronic device 100, that is, display unit 416, clock counter 420, and storage 430, based on the instruction accepted by input unit 412 and the like. Controller 440 includes a key input accepting unit 441, a handwriting input accepting unit 442, a content display processor 443, a content search processor 444, a time management processor 445, and handwritten memo processor 446. In the present embodiment, the respective functions of controller 440 are realized by CPU 150. However, these functions may be realized by hardware such as dedicated circuits and the like.

Key input accepting unit 441 converts an external instruction accepted by key input unit 413 to a signal, and supplies the signal to the other units of controller 440.

Handwriting input accepting unit 442 integrates instructions accepted by handwriting input unit 414 in a predetermined period to supply the resultant to handwritten memo processor 446 as the handwriting input. The "predetermined period" is basically from the acceptance of an instruction to start a handwritten memo creation mode described later to the acceptance of a registration instruction of the handwritten memo. However, when a clear instruction of handwriting is accepted, handwriting input accepting unit 442 erases a history of the instructions from handwriting input unit 414 until the instruction is accepted.

Content display processor 443 displays the description information of the item of the content specified by the user on display unit 416, based on content database 172. Specifically, content display processor 443 creates display data including the description information of the item selected based on the external instruction, based on description database 174, and causes display unit 416 to display a screen based on display data 432.

Content search processor 444 searches the item corresponding to the input by the user from content database 172.

Upon accepting the key input, content search processor 444 searches searching database 173 to extract the items corresponding to the accepted key input. Here, content search processor 444 may extract, as the items corresponding to the accepted key input, not only the item completely matching the accepted key input but also the items in which preceding inputs of a predetermined number or more match the accepted key input or the items in which subsequent inputs of a predetermined number or more match the same.

Content search processor 444 causes display unit 416 to display the extracted items so as to cause the user to select an item from the extracted items. Specifically, based on index database 175, display data 432 including the index information of the items corresponding to the accepted key input is created to cause display unit 416 to display a screen based on display data 432. Upon accepting an instruction to select the displayed index information, content search processor 444 supplies the item corresponding to the selected index information to content display processor 443.

Time management processor 445 acquires time information of clock counter 420. Moreover, time management processor 445 may correct the time information of clock counter 420, based on an instruction from the user or the like.

Handwritten memo processor 446 creates handwritten memo data 182, based on the handwriting input, content database 172, and display data 432, and stores the same in storage 430. Details of operation of handwritten memo processor 446 will be described later.

<Operation>

Electronic device 100 can add a handwritten memo to a screen that displays the description of the item of the content (referred to as a one-subject display screen). Here, referring to FIGS. 10 to 20, the operation of electronic device 100 when the handwritten memo is added to the one-subject display screen of the English-Japanese dictionary will be described. FIGS. 10 to 20 show the screens that electronic device 100 displays on display 130 and on touch panel 120, and transition of the screens. However, electronic device 100 can obviously add the handwritten memo to another one-subject display screen by the operation similar to the following description.

(Handwritten Memo Creation)

Figure 10:
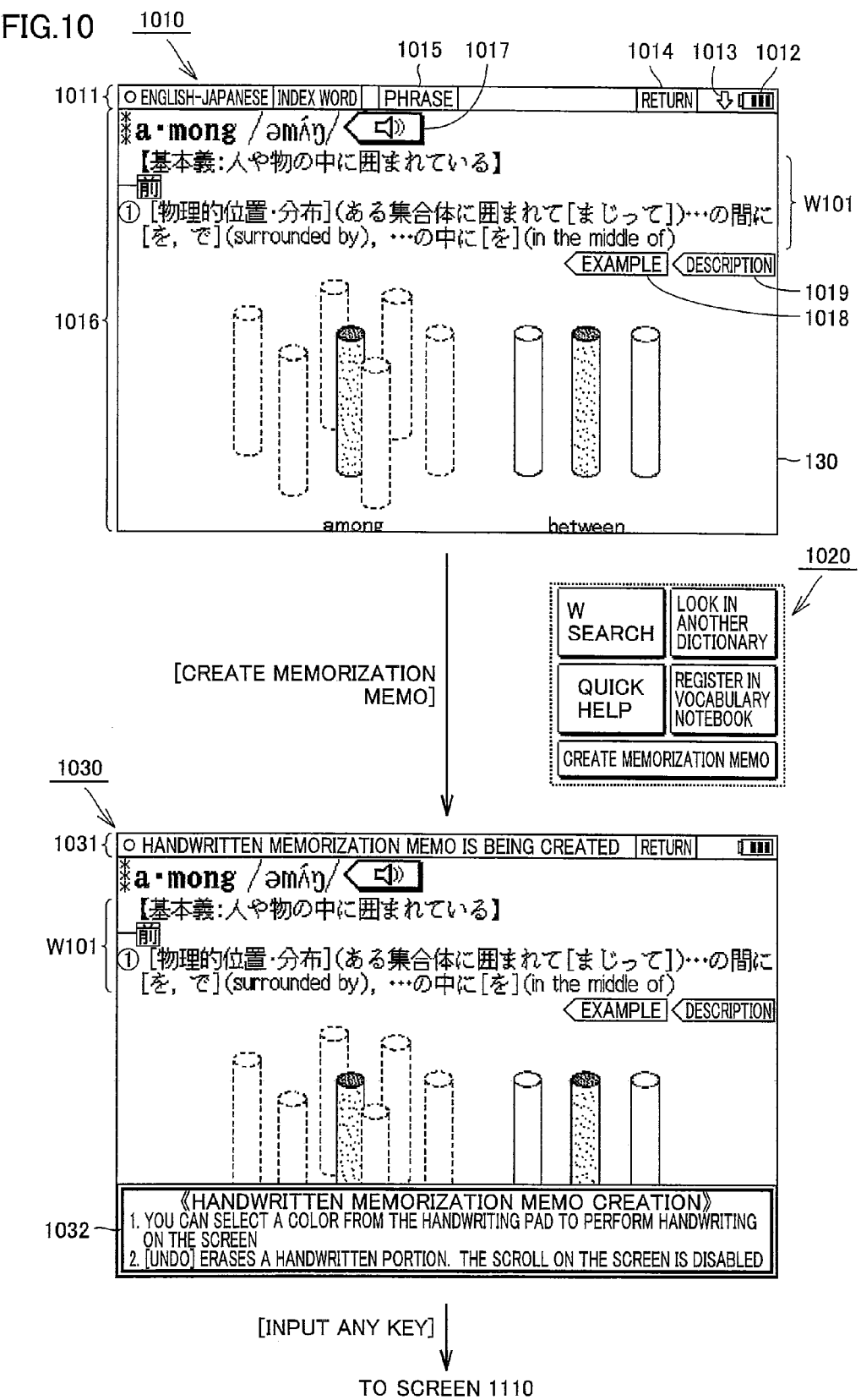
FIG. 10 is a diagram for describing the initiation of creation of a handwritten memo.

FIG. 10 is a diagram for describing the initiation of creation of the handwritten memo (hereinafter, may also be referred to as a "memorization memo" or a "handwritten memorization memo" in the specification and the drawings). When one item (here, an item having an index word "among") of the English-Japanese dictionary is selected, electronic device 100 displays a one-subject display screen 1010 shown in FIG. 10 on display 130. One-subject display screen 1010 substantially includes an information bar 1011 and an item display screen 1016. A text W101 is a text describing the index word "among" in Japanese.

Information bar 1011 displays information relating to the screen displayed on display 130, and information of electronic device 100 itself. Information bar 1011 includes characters showing a type of the display screen (here, "English-Japanese", "Index word"), display 1012 of a remaining amount of a battery to drive electronic device 100, a scroll arrow 1013, a return icon 1014, and a phrase icon 1015.

Scroll arrow 1013 is displayed in the case where the description information is not fully contained in display 130, and item display screen 1016 can be scrolled. Scroll arrow 1013 in FIG. 10 is downward, which indicates that item display screen 1016 can be scrolled downward by downward direction key 304.

When return icon 1014 is touched, electronic device 100 displays an initial screen (keyword input screen) of the English-Japanese dictionary on display 130. When phrase icon 1015 is touched, electronic device 100 activates a phrase application to search a phrase including the displayed index word and displays a search result on display 130.

Item display screen 1016 displays the description information of the item. Item display screen 1016 includes a voice icon 1017, an example icon 1018, and a description icon 1019. When voice icon 1017 is touched, electronic device 100 reproduces voice data associated with the index word. When example icon 1018 is touched, electronic device 100 displays an example sentence associated with the index word on display 130. When description icon 1019 is touched, electronic device 100 displays, on display 130, description that is not displayed in item display screen 1016 (e.g., more particular description).

Electronic device 100 changes the size of characters included in item display screen 1016 in accordance with pressing of character size keys 322 or the like. Moreover, electronic device 100 scrolls item display screen 1016 in accordance with pressing of direction keys 304 in the case where item display screen 1016 does not fit in a display region of display 130.

A screen 1020 is a screen displayed on touch panel 120 when electronic device 100 displays the one-subject screen display on display 130. When each function displayed on touch panel 120 is selected, electronic device 100 starts the selected function.

When "Create a memorization memo" displayed on touch panel 120 is touched, electronic device 100 switches an operation mode to a creation mode of a handwritten memo to display a screen 1030 on display 130. Screen 1030 includes an information bar 1031, an item display screen similar to screen 1010, and a message frame 1032 displayed so as to be superimposed on the item display screen. Information bar 1031 shows a character string of "A handwritten memo is being created" in accordance with the activation of the creation mode of the memorization memo. Message frame 1032 displays notes at the time of handwritten memo creation.

Figure 11:
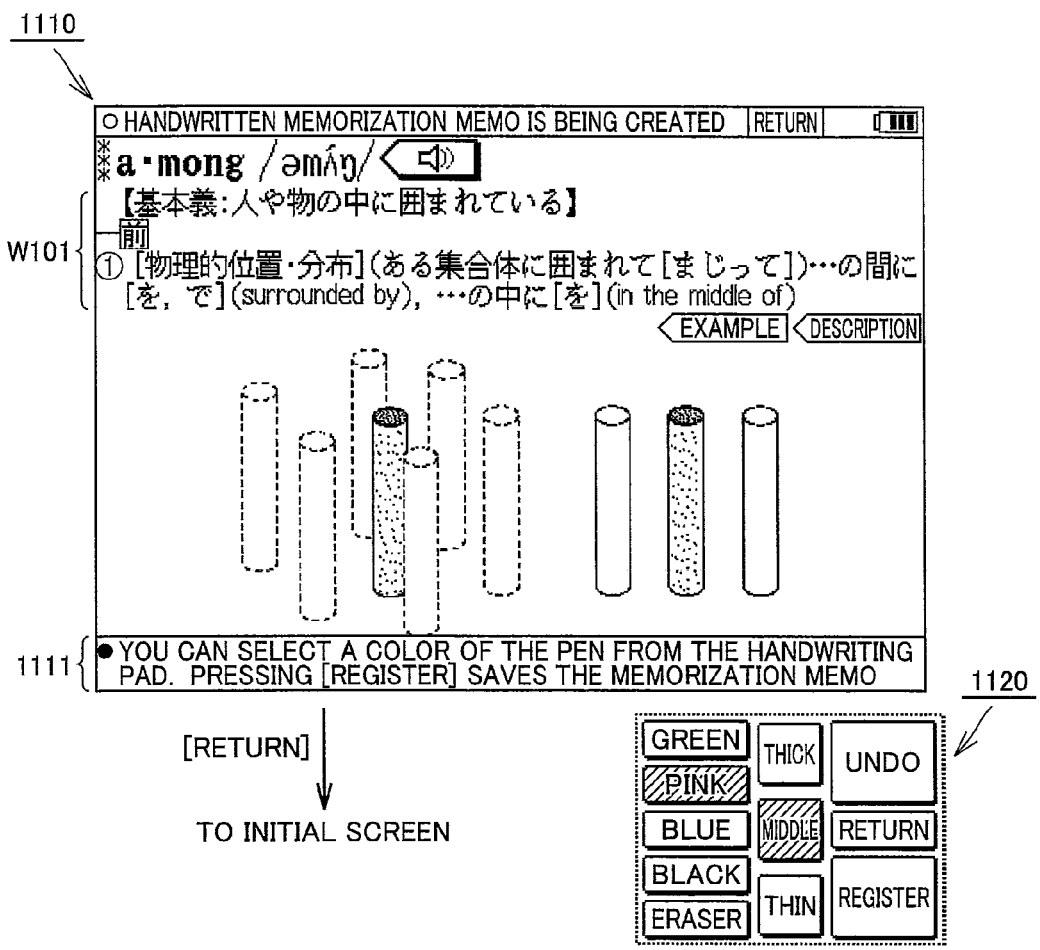
FIG. 11 is a diagram for describing screens displayed on a display and on a touch panel in a handwritten memo creation mode.

Upon accepting any key input in a state where screen 1030 is displayed, electronic device 100 switches the screen displayed on display 130 to a screen 1110 for handwritten memo creation (refer to FIG. 11).

FIG. 11 is a diagram for describing the screens displayed on display 130 and on touch panel 120 in the handwritten memo creation mode. Screen 1110 is a screen displayed on display 130 in the handwritten memo creation mode. A screen 1120 is a screen displayed on touch panel 120 in the handwritten memo creation mode.

Screen 1110 is the screen for handwritten memo creation. Screen 1110 includes item display screen 1016 displayed on display 130 at the time of activation of the handwritten memo creation mode, the information bar, and a help bar 1111.

In the present embodiment, electronic device 100 acquires display data 432 at the time of activation of the handwritten memo creation mode, and creates item display screen 1016 based on acquired display data 432. That is, item display screen 1016 included in screen 1110 is merely an image. As a result, the scroll, and the enlargement and reduction of item display screen 1016 are prohibited, which is different from when the one-subject display screen is displayed. As a result, electronic device 100 can retain a position relationship between item display screen 1016 and the handwritten expression added to item display screen 1016.

Electronic device 100 may fixedly display item display screen 1016 by another method. For example, electronic device 100 may not accept the scroll, and the enlargement and reduction in the handwritten memo creation mode. In this case as well, an effect similar to the foregoing can be obtained.

Here, electronic device 100 displays item display screen 1016 set so as to be editable and item display screen 1016 set so as to be non-editable in a superimposed manner. As seen in description below, as a result, the editing of the handwritten expression becomes easy.

Screen 1120 is the screen displayed on touch panel 120 in the handwritten memo creation mode. Electronic device 100 makes setting of a handwriting color, setting of handwriting thickness, and the like in accordance with the operation on screen 1120. When "Return" on touch panel 120 is selected, electronic device 100 displays the initial screen on display 130.

Figure 12:
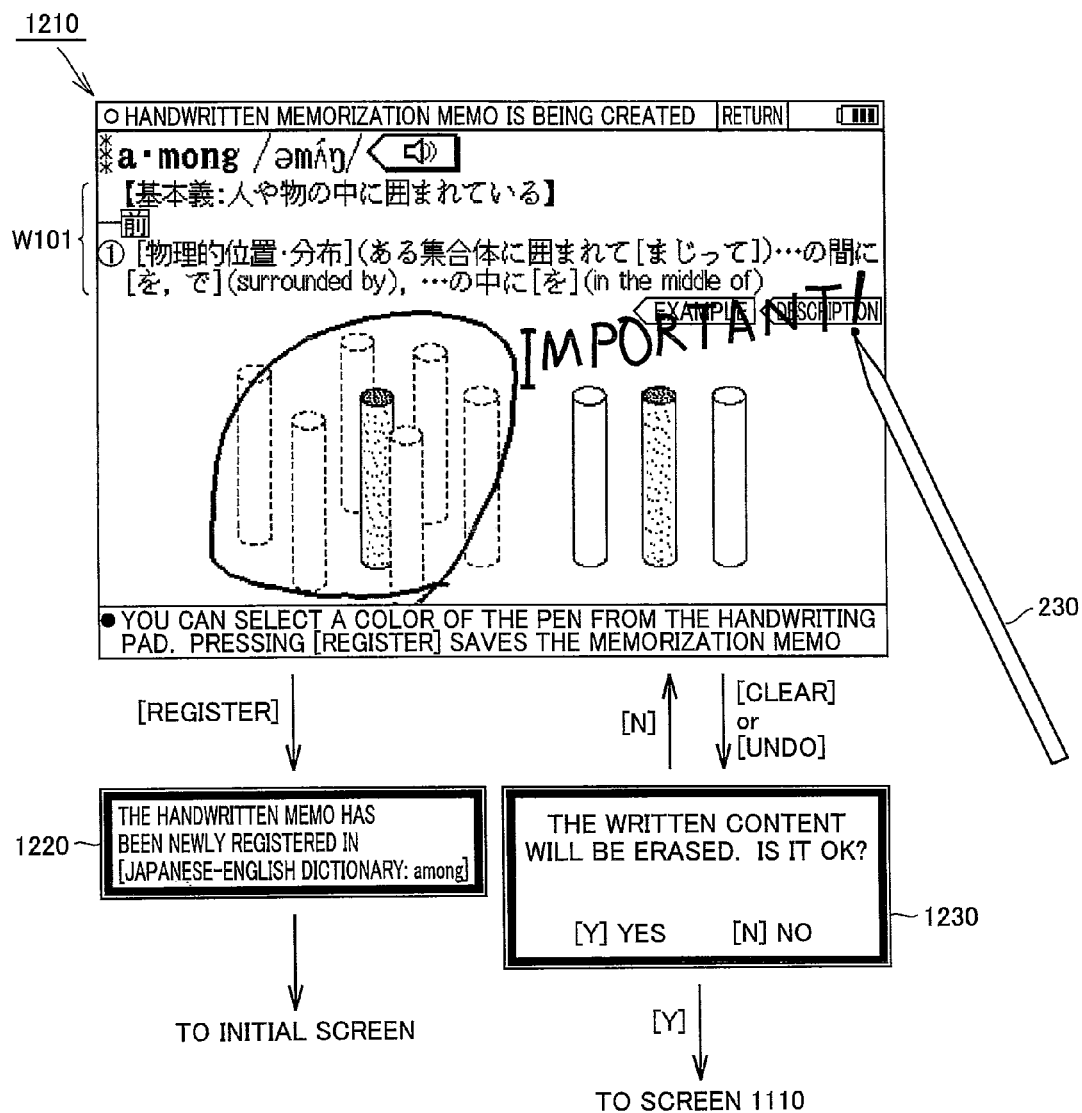
FIG. 12 is a diagram showing a screen with handwritten expression superimposed.

Electronic device 100 displays, on display 130, the handwritten expression in accordance with the handwriting input by stylus pen 230 or the like so as to superimpose the same on item display screen 1016. FIG. 12 shows a screen 1210 with the handwritten expression superimposed. In this manner, the user can add information freely in handwriting to the selected item display screen.

Since item display screen 1016 is fixed as described before, electronic device 100 need not manage the position relationship of the handwritten expression with item display screen 1016. However, when the scroll of the item display screen is absent, electronic device 100 may employ a configuration in which the information relating to only the handwritten expression (which may be a shape of the handwritten expression itself, or may be scroll information indicating a start point/end point, a thickness/color of a line and the like) is associated with the item and the item display screen.

The handwriting will be described more particularly. Electronic device 100 edits item display screen 1016, which is editable in accordance with the handwriting input. Electronic device 100 draws, on item display screen 1016, a line in a color and with a thickness specified on touch panel 120.

Moreover, when "Eraser" on touch panel 120 is selected, performing the handwriting input allows an image in a region where the handwriting input has been performed and an image around the same to be deleted (achromatized). Since two item display screens 1016 are displayed, it seems to the user that only the handwritten expression has been deleted. In this manner, using two item display screens 1016 enables the handwritten expression to be easily deleted.

However, if the deletion processing is not necessary, electronic device 100 may display one item display screen 1016. In this case, when the user performs a wrong handwriting input, the user returns to the screen before the handwriting input to perform the operation of performing handwriting input again or the like.

In this manner, according to electronic device 100, the user can add the information to the one-subject display screen of the content as if a user wrote the information in a dictionary of paper. According to electronic device 100, learning can be visually assisted by drawing a line in the index word or by performing the writing.

When "Register" on touch panel 120 is selected, electronic device 100 captures the image data of the item display screen in which the handwriting input is performed in screen 1210. Electronic device 100 associates the captured image data with the item selected and displayed at the starting time of the handwritten memo creation mode to store the same in hard disk 180 as handwritten memo data 182.

In this manner, according to electronic device 100, the item of the content and the handwriting information added to the item can be associated with each other. This association can increase a range of utilization of the handwriting information.

In the present embodiment, electronic device 100 registers the index information and the content name information of the item in handwritten memo data 182. Furthermore, electronic device 100 stores, in handwritten memo data 182, the time information at the time of registration of the item in handwritten memo data 182 in association with the item. The index information, the content information and the time information are used to facilitate the identification of the registered handwritten memo data 182, as will be described later.

Furthermore, electronic device 100 registers, in handwritten memo data 182, image data of screen 1110 before the handwriting is performed. This is to facilitate the editing of the registered handwritten memo, as will be described later.

When the handwritten memo is registered, electronic device 100 displays a message frame 1220 indicating the registration of the handwritten memo on display 130. Thereafter, electronic device 100 displays the initial screen on display 130.

Once "Undo" on touch panel 120 is selected or clear key 310 is pressed, electronic device 100 displays, on the display, a message frame 1230 to confirm whether or not it is OK to delete the written content. If a Y key is pressed during the display of message frame 1230, electronic device 100 displays, on display 130, screen 1110 before the handwriting is performed. If an N key is pressed during the display of message frame 1230, electronic device 100 displays screen 1210 again.

(Handwritten Memo Calling—No. 1)

Now, operation of electronic device 100 after the handwritten memo has been registered will be described. Electronic device 100 can call the screen with the registered handwriting from the item for which the handwritten memo has been registered. The calling of the screen with handwriting substantially includes calling from the one-subject display screen that displays the description of the item, and calling from a list. First, the calling of the screen with the handwriting from the one-subject display screen will be described.

Figure 13:
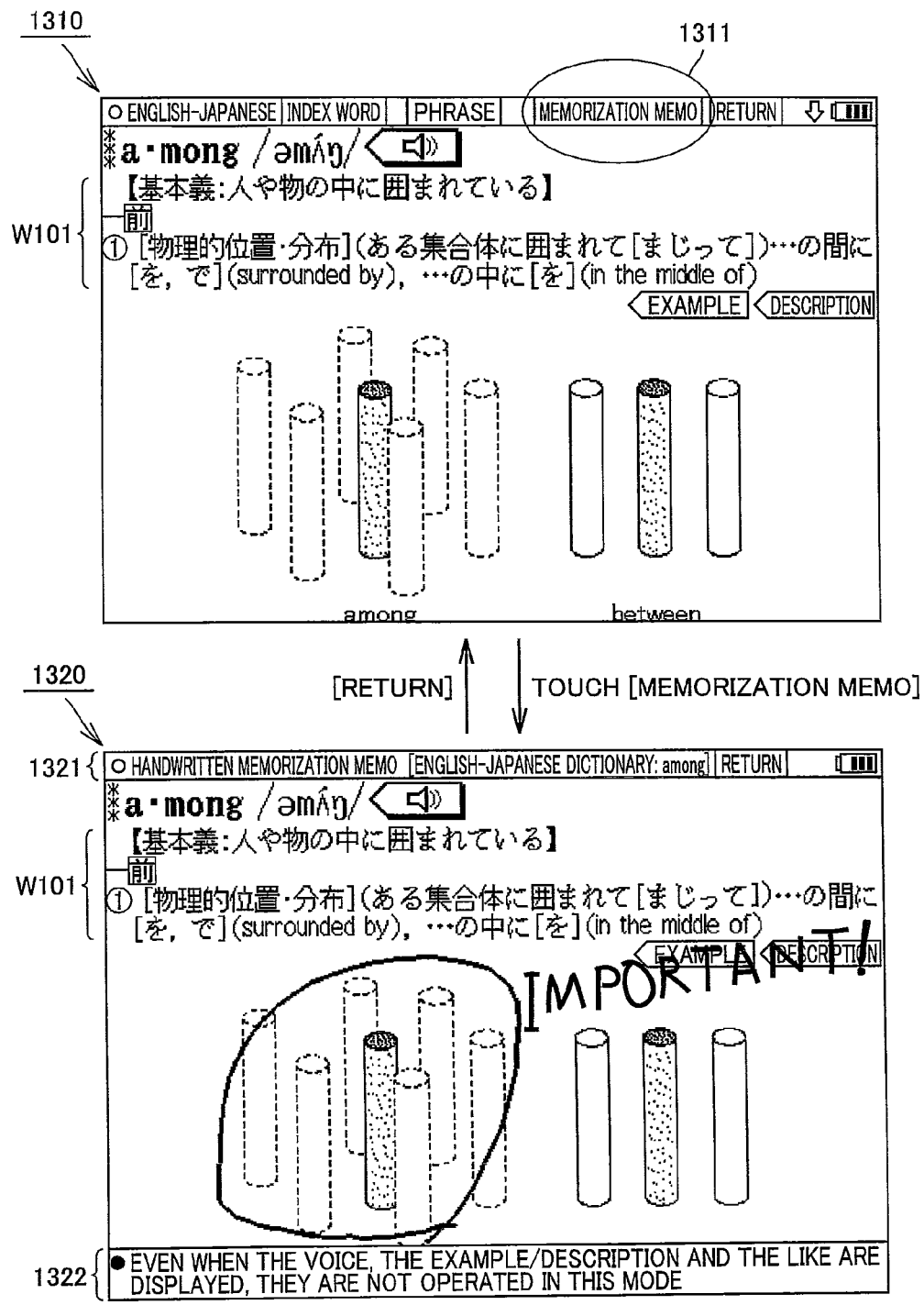
FIG. 13 is a diagram for describing the call of a screen with the handwriting from a one-subject display screen.

FIG. 13 is a diagram for describing the calling of the screen with the handwriting from the one-subject display screen. Referring to FIG. 13, operation of electronic device 100 when the screen with the handwriting is called from the one-subject display screen will be described.

A one-subject display screen 1310 is the one-subject display screen when the item for which the handwritten memo has been registered is selected. A difference from one-subject display screen 1010 before the registration of the handwritten memo lies in that there is an icon 1311 in information bar 1011. On icon 1311, characters of "Memorization memo" are added so as to show that the handwritten memo has been registered.

When icon 1311 is touched, electronic device 100 displays, on display 130, a screen 1320 with handwriting, based on the image data stored in handwritten memo data 182. Screen 1320 includes the item display screen with the handwriting superimposed, an information bar 1321 and a help bar 1322. The item display screen with the handwriting superimposed is created by electronic device 100, based on the image data associated with the item.

Information bar 1321 includes characters of "Handwritten memorization memo" so as to show that the screen with the registered handwriting is called. Furthermore, characters of "English-Japanese dictionary: among" are included so as to show for which item the called screen is called. In the present embodiment, electronic device 100 may create this display, based on the index information and the content name information registered in handwritten memo data 182. However, electronic device 100 may search the index information and the content name information from content database 172 to create this display.

Touching "Return" on touch panel 120 during the display of screen 1320 allows electronic device 100 to again display screen 1310 on display 130.

In the foregoing, the operation in the case where the number of the handwritten memos associated with the item is one has been described. In the case where there are a plurality of handwritten memos associated with the item, electronic device 100, for example, displays the identification information of the respective handwritten memos associated with the item in a selectable manner to display the screen with the handwriting corresponding to the selected identification information.

(Handwritten Memo Calling—No. 2)

Subsequently, the calling of the screen with the handwriting from the list will be described. Electronic device 100 creates a list screen that displays the items registered in handwritten memo data 182 in a selectable manner, based on handwritten memo data 182, in accordance with a predetermined instruction such as pressing of memorization memo key 330, and displays the list screen on display 130.

Figure 14:
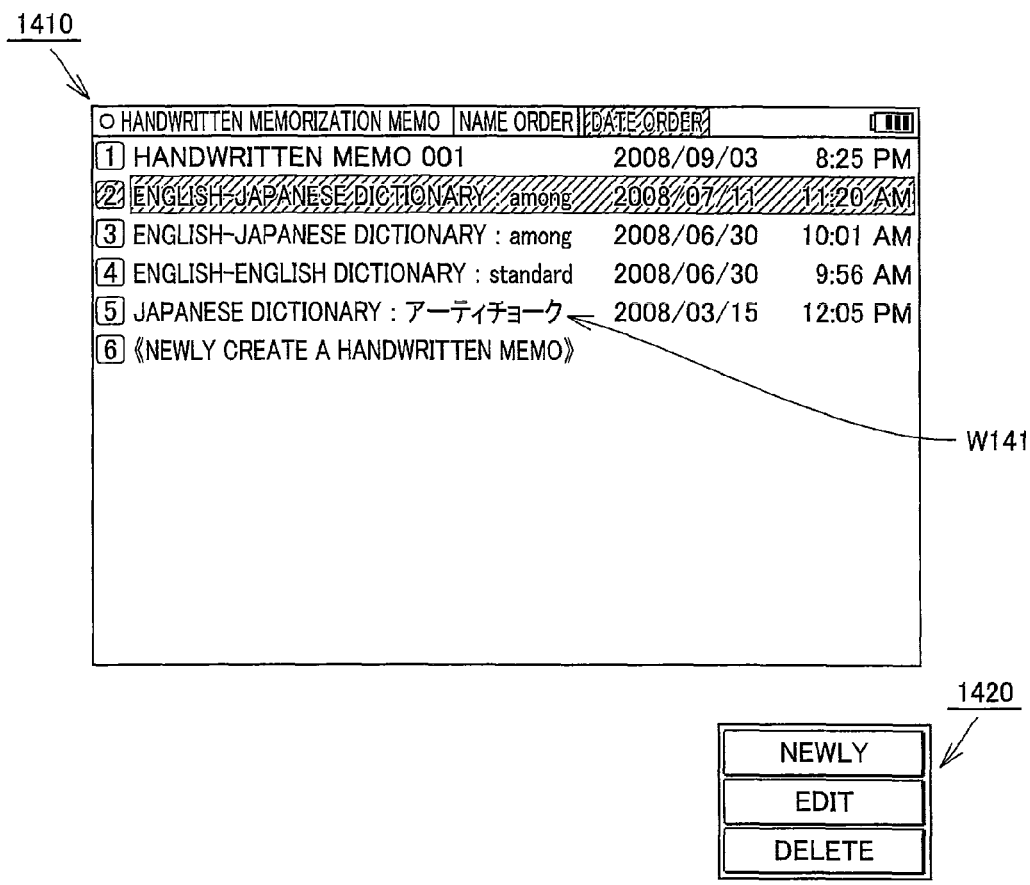
FIG. 14 is a diagram showing the display on the display and on the touch panel when a memorization memo key is pressed.

In FIG. 14, display of display 130 and touch panel 120 when memorization memo key 330 is pressed is shown. Referring to FIG. 14, at this time, electronic device 100 displays a list screen 1410 on display 130. Electronic device 100 displays a screen 1420 on touch panel 120.

Screen 1420 has three areas of "Newly", "Edit" and "Delete". When each of the areas is touched, electronic device 100 performs operation in accordance with each of the areas. This operation will be described later.

In list screen 1410, information for identifying the handwritten memos registered in handwritten memo data 182 (hereinafter, simply referred to as identification information) is displayed in the list in a selectable manner. Moreover, in addition to the identification information, an option for newly creating the handwritten memo (<<Newly create a handwritten memo>>) is displayed.

Second to fifth rows of the list correspond to the items for which the handwritten memos have been created, as described before. Electronic device 100 displays content names, indexes and registration times of the items as the identification information of the handwritten memos. Characters W141 in the fifth row of the list denote a noun indicating an asteraceous perennial (artichoke).

In a first row of the list corresponds to the handwritten memo unrelated to the items of the contents. How these handwritten memos are created will be described later. Electronic device 100 displays characters of "Handwritten memo 001" and the registration time of the relevant memo as the identification information.

Electronic device 100 can sort the list in the order of name, or in the order of date. FIG. 14 is a screen in the case where electronic device 100 sorts the handwritten memos in the order of date. Electronic device 100 displays the handwritten memos with the newer registration times in order from the top of the list. Electronic device 100 displays the option of new creation in a bottom row of the list. The order of the sort is not limited to this. For example, electronic device 100 may display the handwritten memos with the older registration times sequentially from the top of the list. Moreover, electronic device 100 may display the option of new creation in the top row of the list.

Electronic device 100 sets one option of the list as a selection candidate. Electronic device 100 can change the selection candidate in accordance with pressing of the direction keys 304 or the like. Electronic device 100 performs highlight display of the option as the selection candidate. In a state shown in FIG. 14, the option in the second row is the selection candidate. Upon accepting the pressing of search/decision key 306 during the display of the list screen, electronic device 100 selects the option as the selection candidate to display the screen corresponding to the selected option.

Figure 15:
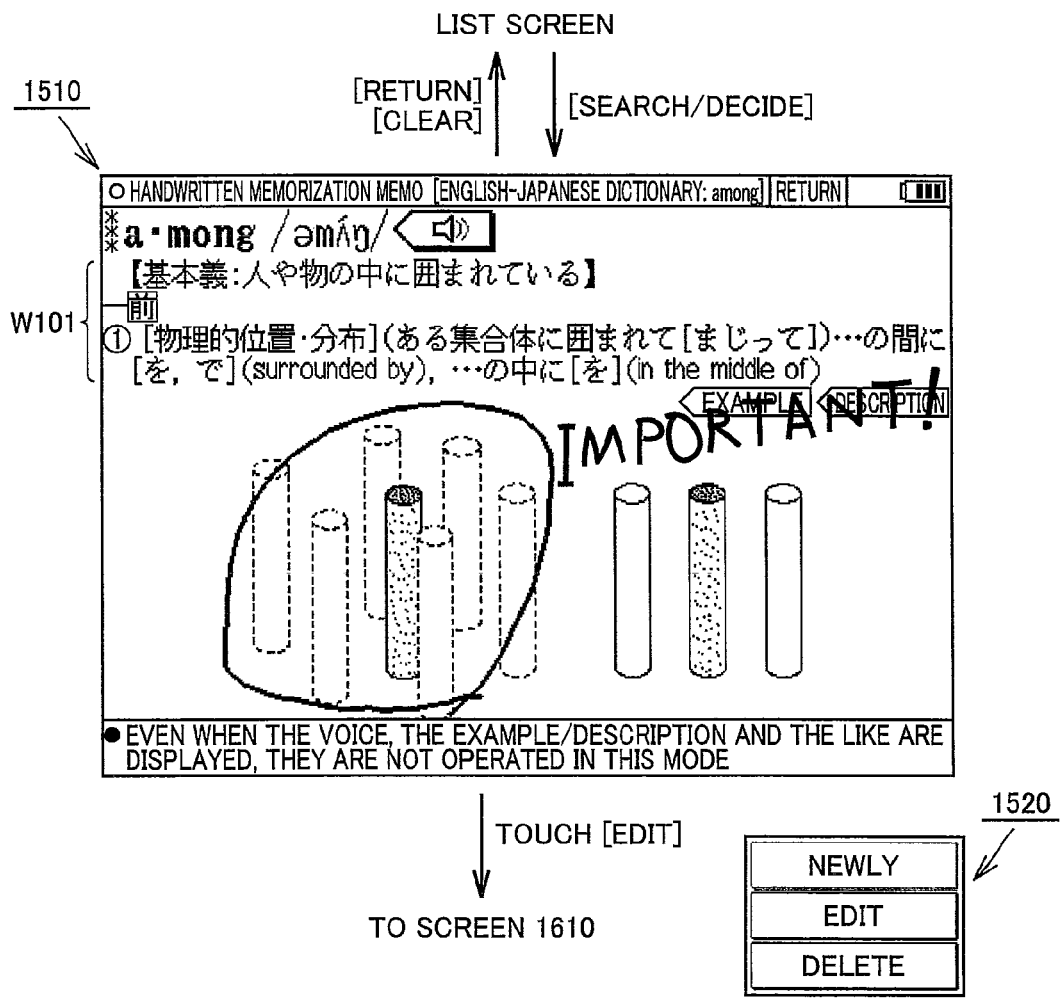
FIG. 15 is a diagram showing screens that the electronic device displays on the display and on the touch panel when an option corresponding to the handwritten memo is selected.

When the option corresponding to the handwritten memo is selected, electronic device 100 calls the screen with the handwriting corresponding to the option. FIG. 15 shows the screens that electronic device 100 displays on display 130 and on touch panel 120 when the option corresponding to the handwritten memo is selected.

Referring to FIG. 15, electronic device 100 displays, on display 130, a screen 1510 including the item display screen with the handwriting. Screen 1510 includes the screen with the handwriting corresponding to the selected option. Screen 1510 includes the item display screen with the handwriting superimposed, the information bar, and the help bar. The item display screen with the handwriting superimposed is created by electronic device 100, based on the image data associated with the item.

Electronic device 100 displays a screen 1520 on touch panel 120. Although screen 1520 is analogous to screen 1420, it is different from screen 1420 in that a portion of "Newly" is displayed translucently. Moreover, electronic device 100 does not respond to touching to the portion of "Newly".

When "Return" on touch panel 120 is touched or clear key 310 is pressed during the display of screen 1320, electronic device 100 again displays list screen 1410 on display 130.

(Editing of Handwritten Memo)

Figure 16:
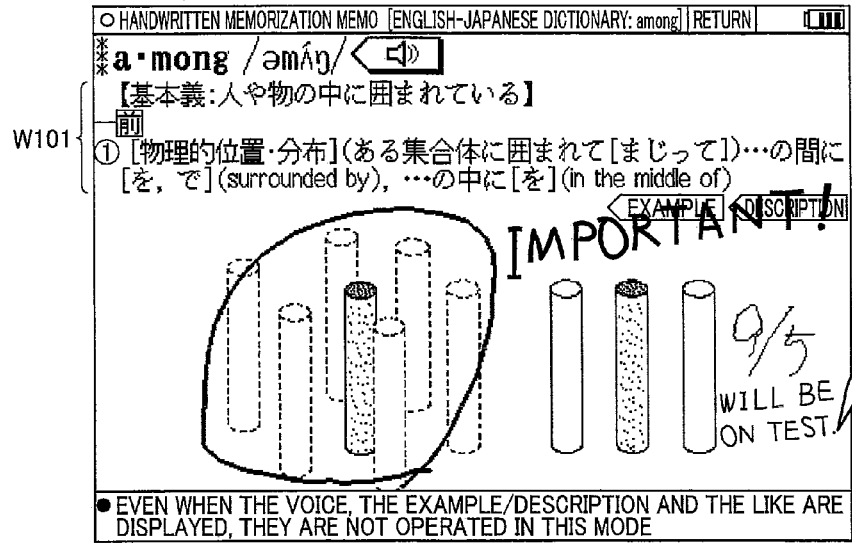
FIG. 16 is a diagram for describing operation of the electronic device in an edit mode of the handwritten memo.

When "edit" on touch panel 120 is touched, electronic device 100 switches the operation mode to an edit mode of the handwritten memo. Hereinafter, referring to FIG. 16, operation of electronic device 100 in the edit mode of the handwritten memo will be described. FIG. 16 is a diagram for describing the operation of electronic device 100 in the edit mode of the handwritten memo.

When "Edit" is touched during the display of screen 1510, electronic device 100 displays an editing screen such as a screen 1610 shown in FIG. 16 on display 130. Particularly, electronic device 100 creates the images based on the image data of the display region of the item display screen and the screen data before the handwriting stored in handwritten memo data 182 is performed, respectively, and displays the two images on display 130 in the superimposed manner. At this time, electronic device 100 displays a screen 1620 on touch panel 120. Screen 1620 is similar to screen 1120 displayed on touch panel 120 in the handwritten memo creation mode, and thus, a description thereof will not be repeated.

Electronic device 100 displays the editing screen not only during the display of screen 1510, but also when "Edit" is touched during the display of list screen 1410. In this case, electronic device 100 displays the editing screen corresponding to the option as the selection candidate in list screen 1410.

Electronic device 100 superimposes the handwritten expression in accordance with handwriting input on the screen. Specifically, electronic device 100 edits the image data of the display region of the item display screen in accordance with the handwriting input. As in the new registration of a handwritten memo, superimposing the two images allows the handwriting that has been already inputted to be deleted.

When "Register" is touched during the display of screen 1610, electronic device 100 displays a screen 1630 on display 130. In screen 1630, a window 1631 to describe a selection method of a saving/registration method for the user is superimposed on the editing screen. Moreover, a help bar 1632 describes the selection method of the saving/registration method to the user. Moreover, electronic device 100 switches the display screen of touch panel 120 to a screen 1640.

When "Overwrite-save" in screen 1640 is touched, electronic device 100 overwrites screen after the editing on the screen before editing in handwritten memo data 182 and saves the resultant. Moreover, electronic device 100 overwrites and saves the registration time information. Electronic device 100 displays, on display 130, a window 1650 indicating that the overwrite-save is performed. Thereafter, electronic device 100 again displays the list screen.

When "Newly register" in screen 1640 is touched, electronic device 100 newly registers the screen after the editing in handwritten memo data 182. Here, information that electronic device 100 registers is similar to that in the handwritten memo creation mode. Electronic device 100 displays, on display 130, a window 1660 indicating that the new registration is performed. Thereafter, electronic device 100 again displays the list screen.

In the case of new registration, in the case where the handwritten memos have been already registered, thereby filling to capacity in registrable number, electronic device 100 displays an alert window indicating that handwritten memos cannot be registered any more, and promoting the user to delete an unnecessary memo.

When "Return to editing" in screen 1640 is touched, electronic device 100 again displays screen 1610 at a point when "Register" is touched.

(Deletion of Handwritten Memo)

Figure 17:
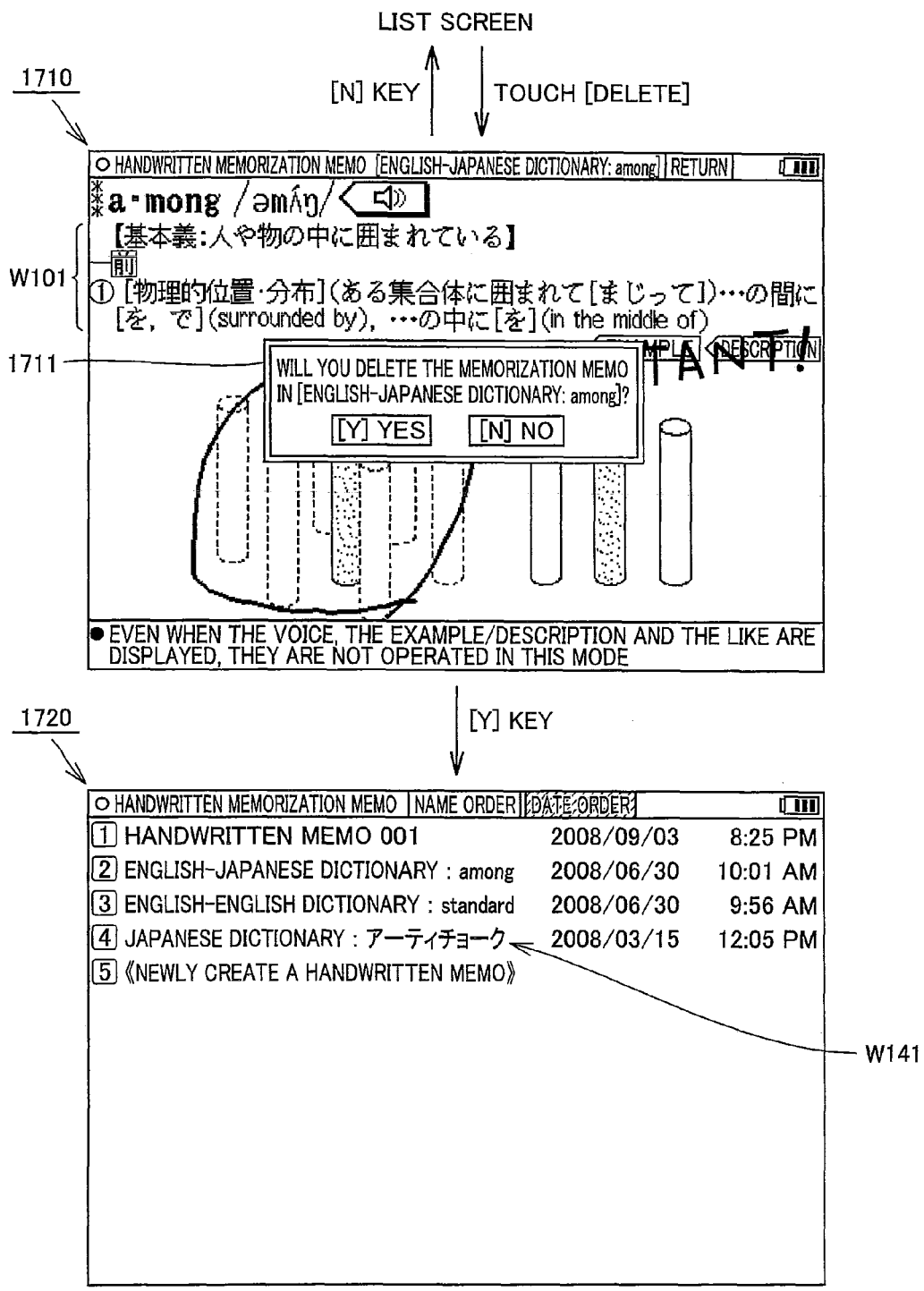
FIG. 17 is a diagram for describing operation of the electronic device at the time of deletion of the handwritten memo.

When "Delete" displayed on touch panel 120 is touched, electronic device 100 deletes the handwritten memo. Hereinafter, referring to FIG. 17, operation of electronic device 100 at the time of deletion of the handwritten memo will be described. FIG. 17 is a diagram for describing the operation of electronic device 100 at the time of deletion of the handwritten memo.

When "Delete" is touched during the display of list screen 1410, electronic device 100 decides, as a deletion candidate, the handwritten memo corresponding to the option as the selection candidate in list screen 1410. Moreover, electronic device 100 displays a screen such as a screen 1710 shown in FIG. 17 on display 130. In screen 1710, a window 1711 to confirm whether or not it is OK to delete the handwritten memo with the user is superimposed on the screen with the handwriting corresponding to the option as the selection candidate in list screen 1410.

Electronic device 100 also displays a screen similar to screen 1710 when "Edit" is touched during the display of screen 1510 in the edit mode in place of during the display of list screen 1410. In this case, electronic device 100 decides the handwritten memo to be edited as a deletion candidate.

When an N key is pressed during the display of the screen 1710, electronic device 100 releases the setting of the deletion candidate. Moreover, electronic device 100 again displays list screen 1410. When the screen shifts from screen 1510 to screen 1710, electronic device 100 again displays screen 1510.

On the other hand, when a Y key is pressed during the display of screen 1710, electronic device 100 deletes the handwritten memo as the deletion candidate. Electronic device 100 displays a list screen 1720 after the deletion of the handwritten memo. As compared with list screen 1410 before the deletion of the handwritten memo, it can be seen that in list screen 1720, the handwritten memo corresponding to the second row in list screen 1410 is deleted.

(Registration of Handwritten Memo Unrelated to Content)

Hereinbelow, creation of the handwritten memo unrelated to the content as mentioned before will be described. In the present embodiment, upon accepting a predetermined instruction, when the list screen is displayed, electronic device 100 creates the above-mentioned handwritten memo.

Figure 18:
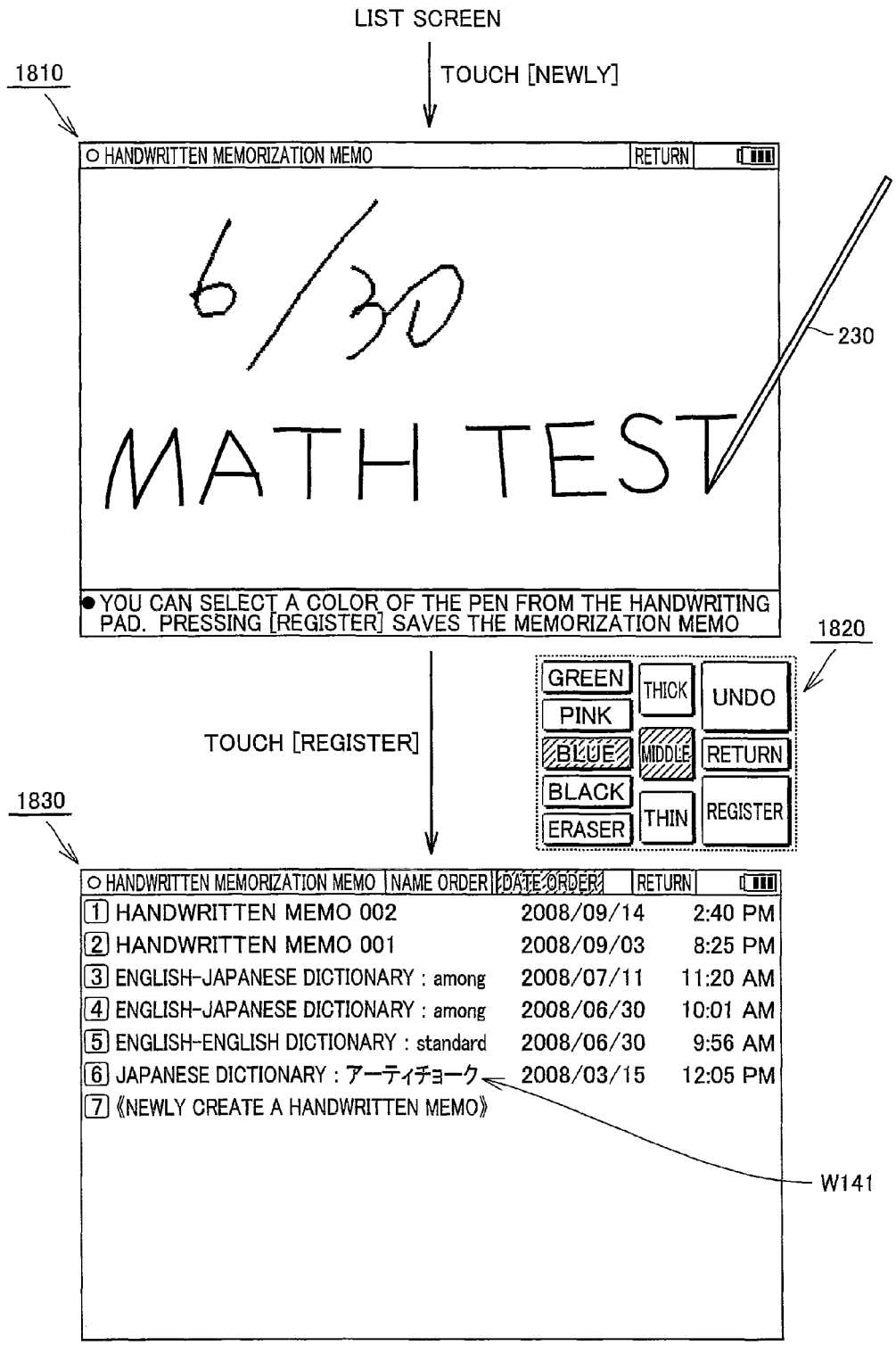
FIG. 18 is a diagram for describing operation of the electronic device when a handwritten memo unrelated to a content is created.

Referring to FIG. 18, the creation of the handwritten memo unrelated to the content will be described. FIG. 18 is a diagram for describing operation of electronic device 100 when the handwritten memo unrelated to the content is created.

When "Newly" on touch panel 120 is touched during the display of the list screen, or when <<Newly create a handwritten memo>> is selected, electronic device 100 displays a new screen for handwritten memo creation on the display. This screen for handwritten memo creation includes the information bar, a handwriting input accepting region, and the help bar. The handwriting input accepting region is blank in an initial state (before the handwriting input is performed).

Moreover, electronic device 100 displays, on touch panel 120, a screen 1820 similar to that at the time of creation of the handwritten memo corresponding to the item. Since operation of electronic device 100 in accordance with touching to screen 1820 is similar to that at the time of creation of the handwritten memo corresponding to the item, details thereof will not be repeated.

Upon accepting the handwriting input to the handwriting input accepting region by stylus pen 230 or the like, electronic device 100 displays the handwritten expression corresponding to the handwriting input on the display. A screen 1810 shown in FIG. 18 is one example of a screen after the handwriting input is performed.

When "Register" is touched, electronic device 100 captures image data of the handwriting accepting region in screen 1810. Electronic device 100 registers the captured image data in handwritten memo data 182.

At this time, electronic device 100 stores the identification information of the image data in handwritten memo data 182 in association with the image data. Electronic device 100 associates "Handwritten memo+(a serial number)" and the registration information with the image data as the above-described identification information of the handwritten memo unrelated to the content. In this case, since "Handwritten memo 001" has been already present, electronic device 100 gives the new handwritten memo "Handwritten memo 002" as the identification information.

Unlike the case where the handwritten memo is registered to the item of the content, electronic device 100 need not register, in handwritten memo data 182, the image data of the screen before the handwriting is performed. This is because since the screen before the handwriting is performed is blank, the display screen does not change even if the handwritten expression and the vicinity thereof are deleted.

(Preview Display)

Electronic device 100 according to the present embodiment can also perform preview display of the screen with the registered handwriting in the list screen. Hereinafter, referring to FIGS. 19 and 20, operation of electronic device 100 relating to the preview display will be described.

Referring to FIG. 19, when preview key 340 is pressed during the display of a normal list screen 1910, electronic device 100 displays a screen 1920 including a preview screen. Screen 1920 includes a reduced list screen 1921 and a preview screen 1922.

Screen 1921 displays the identification information of the handwritten memos registered in handwritten memo data 182 or a part of the identification information. In the case where the identification information cannot be fully contained in screen 1921, electronic device 100 displays a leading numeric character of the identification information and " . . . " indicating that the identification information is omitted in screen 1921. Electronic device 100 determines whether or not the identification information can be fully contained in screen 1921, for example, based on a number of characters of the identification information. As in the normal list screen, one option displayed in screen 1921 is set as a selection candidate.

Preview screen 1922 displays a part of the screen with the handwriting corresponding to the option as the selection candidate. Here, electronic device 100 displays, on preview screen 1922, the screen with the handwriting whose right side is cut.

Arrangement of preview screen 1922 is not limited to that shown in FIG. 19. For example, electronic device 100 may display the preview screen having the same width as that of display 130 in a lower portion of the screen. In this case, electronic device 100 displays, on preview screen 1922, the screen with the handwriting whose lower side (or whose upper side) is cut.

Figure 20:
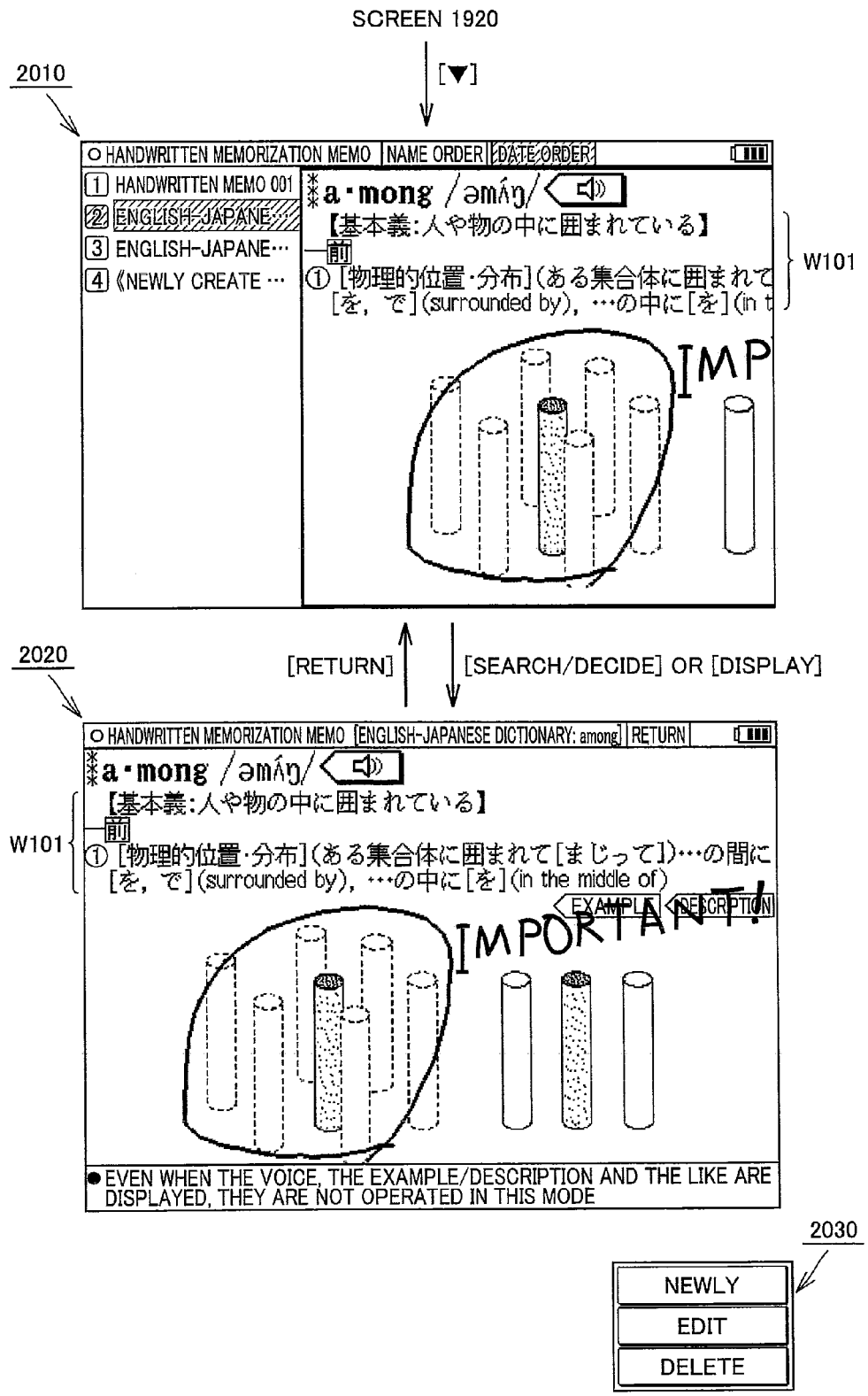
FIG. 20 is a diagram for describing operation of the electronic device relating to preview display.

Electronic device 100 changes the display content of preview screen 1922 in accordance with the change of the selection candidate in the list screen. Referring to FIG. 20, when the downward key of direction keys 304 is pressed when the screen 1920 is displayed, electronic device 100 changes the selection candidate to a second option to thereby display a screen 2010. That is, electronic device 100 changes a position of highlight display of the list screen with the change of the selection candidate. Furthermore, electronic device 100 displays the screen with the handwriting corresponding to the new selection candidate on the preview screen.

Upon accepting the pressing of search/decision key 306, or touching of "Display" displayed on touch panel 120, electronic device 100 displays a screen including the overall screen with the handwriting, which is preview-displayed. FIG. 20 shows a screen 2020 displayed on the display when search/decision key 306 is pressed or when "Display" is touched during the display of screen 2010. Also, FIG. 20 shows a screen 2030 displayed on touch panel 120 at this time. This state is the same as the state when one option is selected from the normal list screen (a state shown in FIG. 15). Accordingly, operation of electronic device 100 from this state is similar to the operation described before, and thus, a description thereof will not be repeated.

<Flow of Processing>

Hereinbelow, a flow of processing that controller 440 of electronic device 100 performs in realizing the operation described above will be described.

(One-Subject Display)

Figure 21:
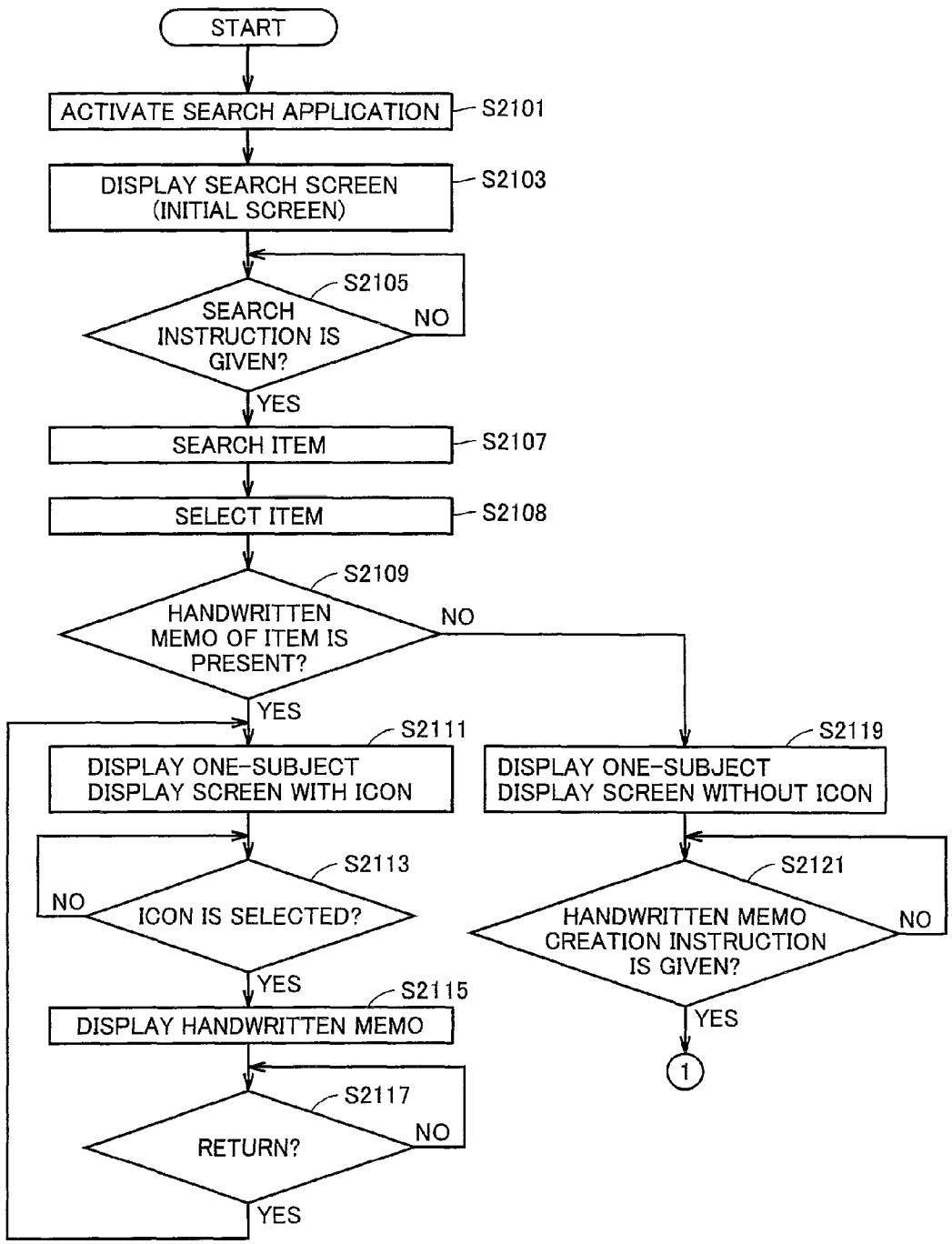
FIG. 21 is a diagram showing, in a flowchart form, a flow of processing that a controller performs with regard to display of the one-subject display screen.

FIG. 21 is a diagram showing, in a flowchart form, a flow of processing that controller 440 performs with regard to the display of the one-subject display screen.

Referring to FIG. 21, in step S2101, controller 440 activates a search application for searching an item from the content. More specifically, controller 440 selects the search application from search applications corresponding to a plurality types of contents, based on an instruction accepted by input unit 412, and activates the application. As the search applications, there are a dictionary application that performs index word search of the dictionary, an example sentence collection application that searches a sentence example from the example sentence collection, and the like. Hereinafter, operation of electronic device 100 when the dictionary application is activated will be focused on and described.

In the case where electronic device 100 is a dedicated machine that specializes in the search of one content, controller 440 only needs to constantly activate the search application, and the processing in step S2101 can be omitted.

In step S2103, controller 440 displays a search screen (initial screen) in the activated search application on display 130. For example, the initial screen of the dictionary application is a screen to promote key input to the user.

In step S2105, content search processor 444 included in controller 440 determines whether or not input unit 412 has accepted a search instruction of the item. If input unit 412 has not accepted the search instruction (NO in step S2105), content search processor 444 repeats the processing in step S2105. On the other hand, if input unit 412 has accepted the search instruction (YES in step S2015), content search processor 444 advances to processing in step 2107.

In step S2107, content search processor 444 extracts the items from the content, based on the key input until the acceptance of the search instruction. Content search processor 444 extracts the items completely matching, or whose prefix matches (or whose suffix matches) the accepted key input. Moreover, content search processor 444 causes display unit 416 to display the extracted items (strictly, the index information of the items).

In step S2108, content display processor 443 selects one item from the items displayed on display unit 416, based on an instruction accepted by input unit 412.

In the case where the activated application is not an application that searches the item using the searching information such as the dictionary application, the processing from step S2105 to step S2108 is not performed. For example, when the example sentence collection application is activated, content display processor 443 selects the item, based on an instruction accepted by input unit 412.

In step S2109, content display processor 443 determines whether or not there is a handwritten memo of the selected item, that is, the selected item has been registered in handwritten memo data 182.

If the handwritten memo of the selected item is present (YES in step S2109), in step S2111, content display processor 443 causes display 130 to display the one-subject display screen of the selected item to which the icon indicating that the handwritten memo is present is added.

Subsequently, in step S2113, handwritten memo processor 446 included in controller 440 determines whether or not input unit 412 has accepted a selection instruction of the icon. If input unit 412 has not accepted the selection instruction of the icon (NO in step S2113), handwritten memo processor 446 repeats the processing step S2113. If input unit 412 has accepted the selection instruction of the icon (YES in step S2113), handwritten memo processor 446 advances to processing in step S2115.

Subsequently, in step S2115, handwritten memo processor 446 causes display 130 to display the screen with the handwriting corresponding to the selected item, based on handwritten memo data 182.

Subsequently, in step S2117, handwritten memo processor 446 determines whether or not input unit 412 has accepted an instruction to return the displayed screen to the one-subject display screen. If input unit 412 has not accepted the instruction (NO in step S2117), handwritten memo processor 446 repeats the processing in step S2117. If input unit 412 has accepted the instruction (YES in step S2117), handwritten memo processor 446 stops the display of the screen with the handwriting, and controller 440 comes back to the processing in step S2111.

The processing returns to the branch of step S2109, and if the handwritten memo of the selected item is absent (NO in step S2109), in step S2119, content display processor 443 causes display 130 to display the one-subject display screen of the selected item. In this case, content display processor 443 does not add the icon, which is added to the one-subject display screen in step S2111, to the one-subject display screen.

Subsequently, in step S2121, handwritten memo processor 446 included in controller 440 determines whether or not input unit 412 has accepted a creation instruction of a handwritten memo. If input unit 412 has not accepted the creation instruction of the handwritten memo (NO in step S2121), handwritten memo processor 446 repeats the processing in step S2121. If input unit 412 has accepted the creation instruction of the handwritten memo (YES in step S2121), handwritten memo processor 446 starts creation processing of the handwritten memo (refer to the next FIG. 22).

(Creation of Handwritten Memo to Item)

Figure 22:
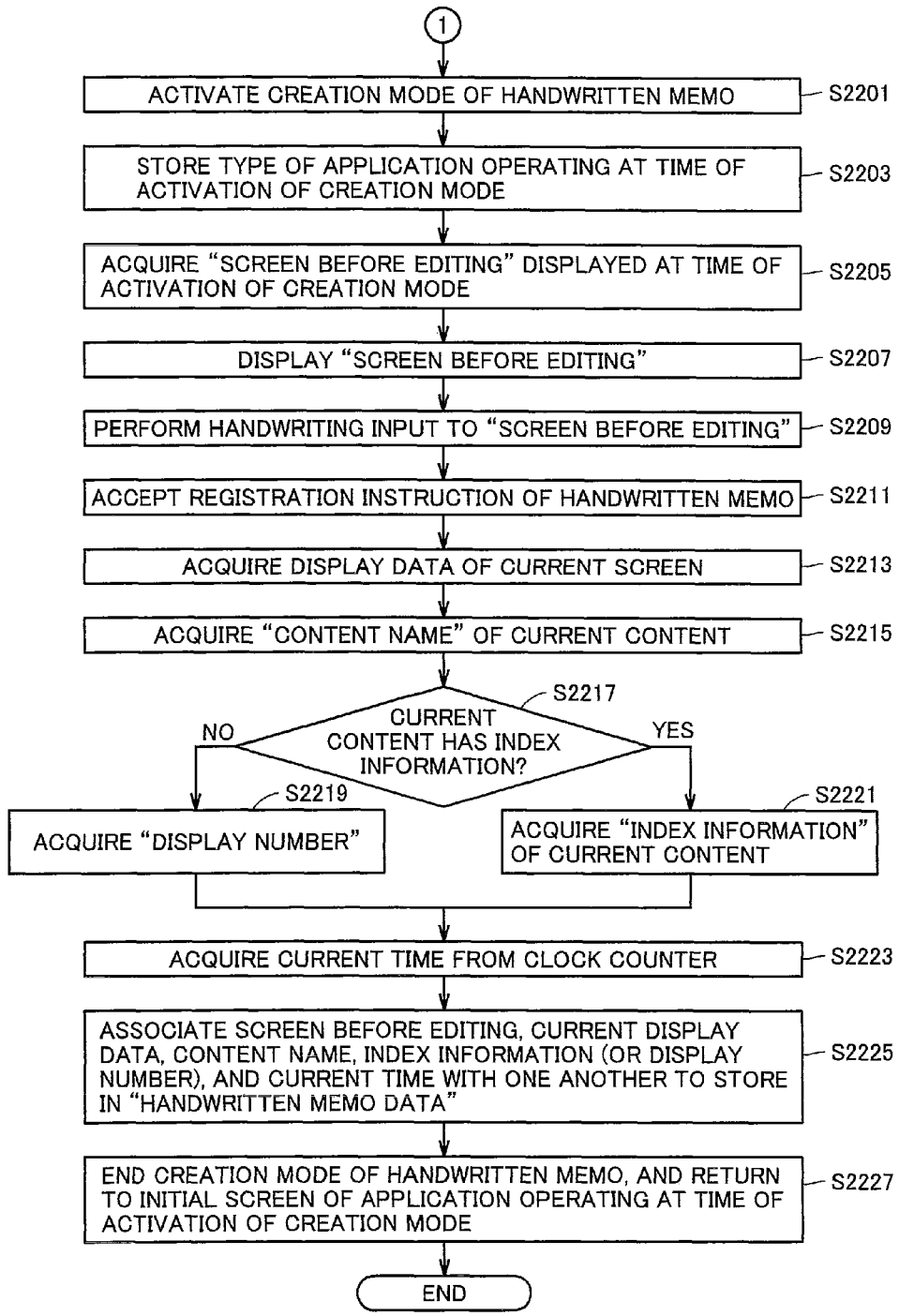
FIG. 22 is a diagram showing, in a flowchart form, a flow of processing that a handwriting processor according to a first embodiment performs in creating the handwritten memo.

Referring to FIG. 22, a flow of processing that handwritten memo processor 446 included in controller 440 performs in creating the handwritten memo will be described. FIG. 22 is a diagram showing, in a flowchart form, the flow of the processing that handwritten memo processor 446 according to the first embodiment performs in creating the handwritten memo.

In step S2201, handwritten memo processor 446 activates the creation mode of the handwritten memo.

In step S2203, handwritten memo processor 446 stores a type of the application operating at the time of activation of the creation mode in a predetermined storage area of storage 430. When a number of the types of the applications is one, handwritten memo processor 446 may not perform this processing.

In step S2205, handwritten memo processor 446 acquires display data of the item display screen displayed at the time of activation of the creation mode (hereinafter, also referred to as a screen before editing) and stores the same in a predetermined storage area of storage 430.

In step S2207, handwritten memo processor 446 causes display 130 to display the screen before editing. As described before, in the present embodiment, handwritten memo processor 446 displays the editable screen before editing, the non-editable screen before editing in a superimposed manner on display 130. This is to enable the user to easily delete the handwriting input, which has been already performed.

In step S2209, handwritten memo processor 446 accepts the handwriting input, and causes display 130 to display the screen in which the handwritten expression in accordance with the accepted handwriting input is superimposed on the screen before editing. Specifically, handwritten memo processor 446 adds the handwritten expression to the editable screen before editing, and causes display 130 to display the screen before editing to which the handwritten expression is added, and the unedited screen before editing in a superimposed manner.

In step S2211, handwritten memo processor 446 accepts a registration instruction of the handwritten memo. In the present embodiment, handwritten memo processor 446 considers touching to "Register" on touch panel 120 to be the registration instruction of the handwritten memo.

In step S2213, handwritten memo processor 446 acquires the image data of the item display screen displayed on display 130 at the time of accepting the registration instruction. Hereinafter, the screen and the image data at the time of accepting the registration instruction may be referred to as a "current" screen and image data.

In step S2215, handwritten memo processor 446 searches content name database 176 to acquire the content name of the content treated in the application activated at the time of accepting the registration instruction (hereinafter, also referred to as a "current content").

In step S2217, handwritten memo processor 446 searches index database 175 to determine whether or not the current content has the index information.

If the current content does not have the index information (NO in step S2217), handwritten memo processor 446 acquires a display number for identifying the handwritten memo at the time of display in step S2219. Handwritten memo processor 446 gives the display numbers in accordance with a registration order of the content to the content not having the index information. That is, the display numbers are serial numbers. Thereafter, handwritten memo processor 446 advances to processing in step S2223.

If the current content has the index information (YES in step S2217), handwritten memo processor 446 acquires the index information of the current content in step S2221. Thereafter, handwritten memo processor 446 advances to the processing in step S2223.

In step S2223, handwritten memo processor 446 acquires a current time as the registration time of the handwritten memo from clock counter 420.

In step S2225, handwritten memo processor 446 associates the screen before editing, the current display data, the content name, the index information (or display number), and the current time with one another to store the same in storage 430 as handwritten memo data 182.

In step S2227, handwritten memo processor 446 causes display 130 to display the initial screen of the application of the type stored in step S2203, that is, the application operating at the time of activation of the creation mode of the handwritten memo, and ends the creation mode of the handwritten memo.

(List Display and Editing of Handwritten Memo)

Figure 23:
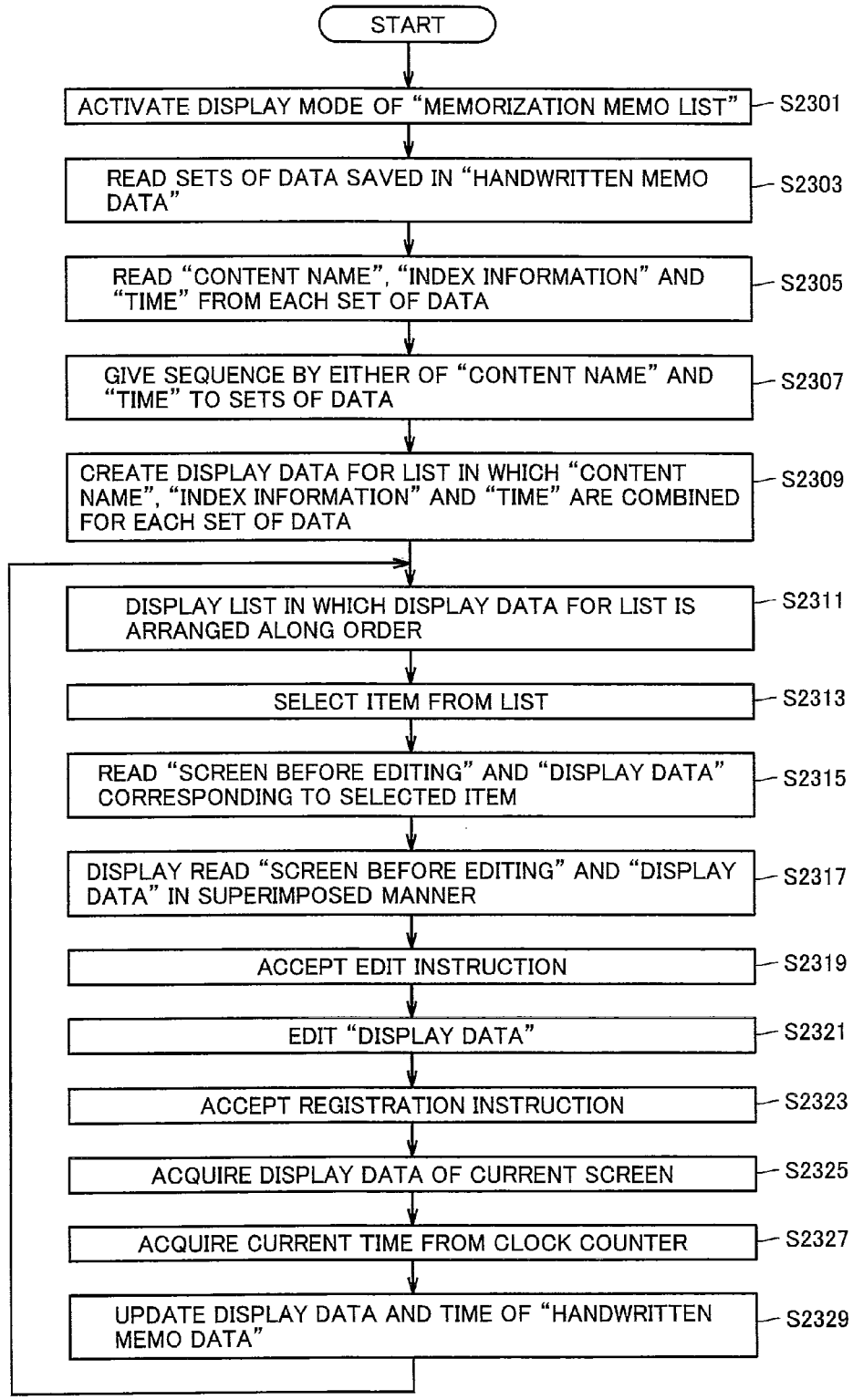
FIG. 23 is a diagram showing, in a flowchart form, a flow of processing that a handwritten memo processor 446 according to the first embodiment performs in creating registered handwritten memo.

Referring to FIG. 23, a flow of processing that handwritten memo processor 446 performs in list display and editing of the registered handwritten memos will be described. FIG. 23 is a diagram showing, in a flowchart form, the flow of the processing that handwritten memo processor 446 according to the first embodiment performs in creating the registered handwritten memos.

In step S2301, handwritten memo processor 446 activates a display mode of the memorization memo list in accordance with an instruction accepted by input unit 412. In the present embodiment, handwritten memo processor 446 activates the display mode of the memorization memo list in accordance with the pressing of memorization memo key 330.

In step S2303, handwritten memo processor 446 reads sets of data saved in handwritten memo data 182 and associated with one another, respectively. Specifically, handwritten memo processor 446 reads each combination of the screen before editing, the current display data, the content name, the index information (or display number), and the current time.

In step S2305, handwritten memo processor 446 reads the "content name", the "index information" and the "time" from each of the sets of data, and temporarily stores the same in association with the identification information of the set of data in storage 430 (preferably, in RAM 160 with a fast readout speed).

In step S2307, handwritten memo processor 446 gives a sequence by either of the "content name" and the "time" to the respective sets of data, based on the read content names and times. Which sequence handwritten memo processor 446 gives can be set by the user.

In step S2309, handwritten memo processor 446 creates display data for list in which the "content name", the "index information" and "time" are combined for each of the sets of data.

In step S2311, handwritten memo processor 446 causes display unit 416 to display the list in which the display data for list is arranged along the order.

In step S2313, handwritten memo processor 446 selects the item (option in the list) from the list, based on an instruction accepted by input unit 412.

In step S2315, handwritten memo processor 446 reads the screen before editing and the display data corresponding to the selected item from handwritten memo data 182.

In step S2317, handwritten memo processor 446 causes display 130 to display the read screen before edit and the display data in a superimposed manner.

In step S2319, handwritten memo processor 446 accepts an edit instruction from input unit 412. Handwritten memo processor 446 then shifts to the edit mode of the handwritten memo.

In step S2321, handwritten memo processor 446 edits the display data read in step S2315, based on the input accepted by input unit 412, particularly the handwriting unit.

In step S2323, handwritten memo processor 446 accepts a registration instruction of the handwritten memo from input unit 412. While as the registration instruction, there are overwriting registration and new registration, with either instruction, a substantial flow of the processing does not differ. Thus, both cases will be described together.

In step S2325, handwritten memo processor 446 acquires the display data of the item display screen at the point when the registration instruction is accepted in step S2323.

In step S2327, handwritten memo processor 446 acquires the current time from clock counter 420.

In step S2329, when the registration instruction is an overwriting registration instruction, handwritten memo processor 446 updates the display data and the time of handwritten memo data 182. When the registration instruction is a new registration instruction, handwritten memo processor 446 adds the screen before editing, the current display data, the content name, the index information (or the display number) and the current time with one another to handwritten memo data 182 in association with one another. As the screen before editing, the content name and the index information (or the display number), handwritten memo processor 446 utilizes those of the set of data to be edited.

(Deletion of Handwritten Memo)

Figure 24:
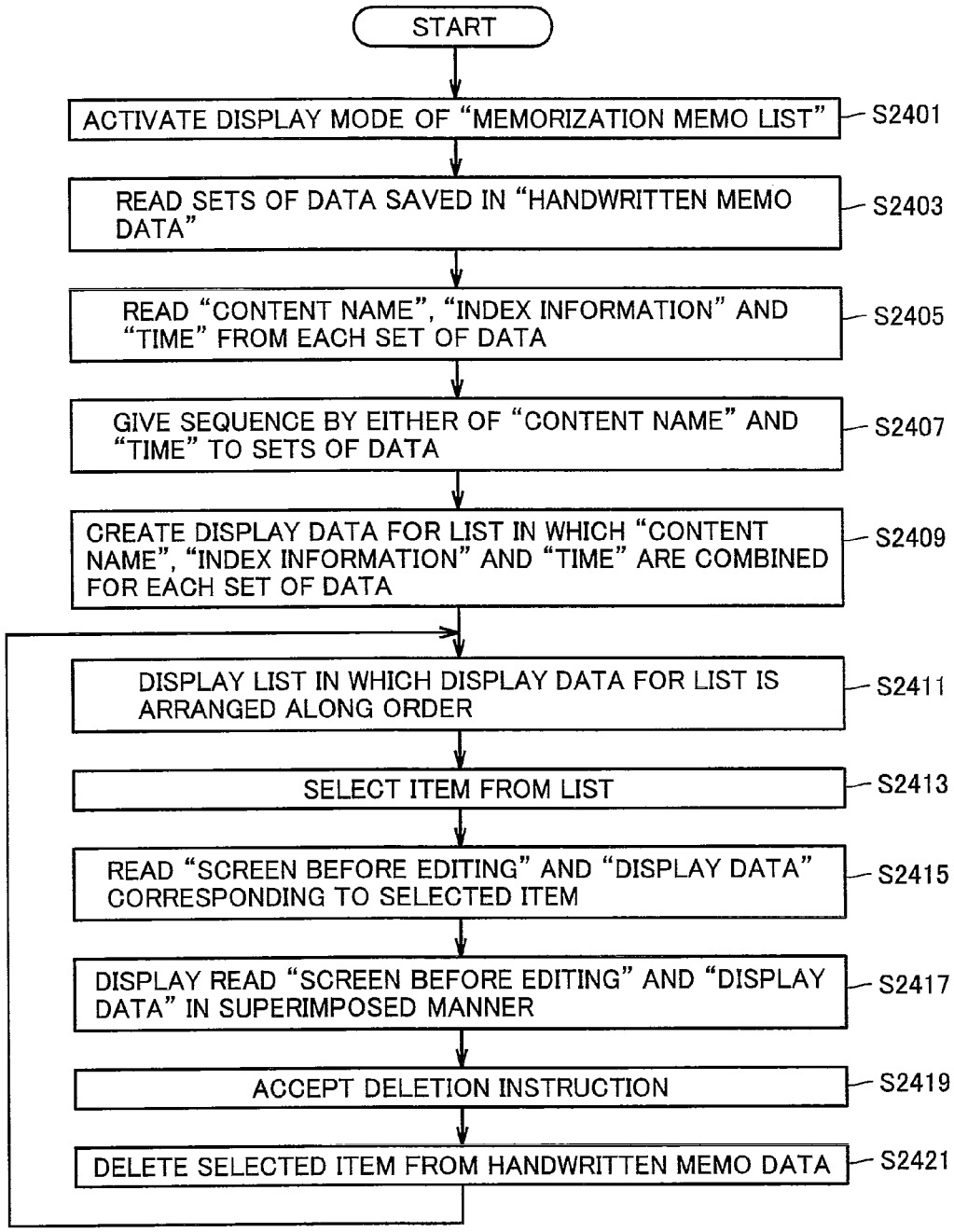
FIG. 24 is a diagram showing, in a flowchart form, a flow of processing that handwritten memo processor 446 performs in deleting the registered handwritten memo.

Referring to FIG. 24, a flow of processing that handwritten memo processor 446 performs when the registered handwritten memo is deleted will be described. FIG. 24 is a diagram showing, in a flowchart form, the flow of the processing that handwritten memo processor 446 performs in deleting the registered handwritten memo.

Steps S2401 to S2417 are similar to steps S2301 to S2317 described with reference to FIG. 23. That is, by the above-described series of processing, handwritten memo processor 446 performs the list display of the registered handwritten memos, and selects one of the handwritten memos from the list. Furthermore, handwritten memo processor 446 causes display 130 to display the one-subject display screen corresponding to the selected handwritten memo, in which the handwriting is superimposed.

In step S2419, handwritten memo processor 446 accepts a deletion instruction of the handwritten memo from input unit 412.

In step S2421, handwritten memo processor 446 deletes the item selected in step S2413 from handwritten memo data 182. Handwritten memo processor 446 returns to the processing in step S2411 to display the list of the handwritten memos. At this time, the deleted item is not displayed in the list.

(Registration of Handwritten Memo Unrelated to Item)

Figure 25:
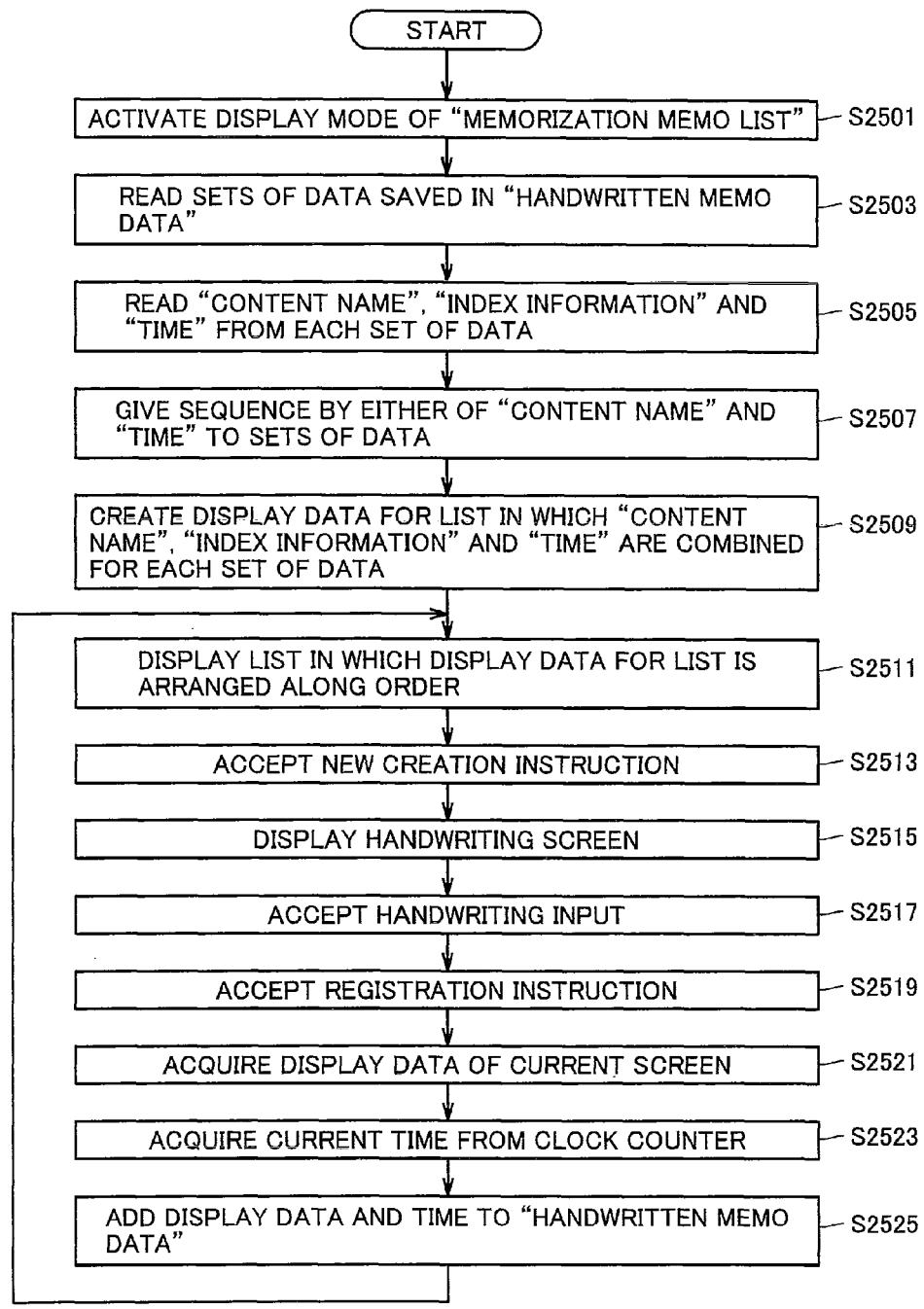
FIG. 25 is a diagram showing, in a flowchart form, a flow of processing that handwritten memo processor 446 performs in registering a handwritten memo unrelated to an item.

Referring to FIG. 25, a flow of processing that handwritten memo processor 446 performs in creating the handwritten memo unrelated to the item of the content will be described. FIG. 25 is a diagram showing, in a flowchart form, the flow of the processing that handwritten memo processor 446 performs in registering the handwritten memo unrelated to the item.

Steps S2501 to S2511 are similar to steps S2301 to S2311 described with reference to FIG. 23. That is, by the above-described series of processing, handwritten memo processor 446 performs the list display of the registered handwritten memos.

In step S2513, handwritten memo processor 446 accepts a new creation instruction of the handwritten memo from input unit 412.

In step S2515, handwritten memo processor 446 causes display 130 to display a handwriting screen. Here, handwritten memo processor 446 creates a screen including a plain (blank) region that can accept the handwriting as the handwriting screen.

In step S2517, handwritten memo processor 446 accepts the handwriting input from handwriting input unit 414. Moreover, handwritten memo processor 446 causes display 130 to display the handwritten expression in accordance with the accepted handwriting input.

In step S2519, handwritten memo processor 446 accepts a registration instruction of the handwritten memo from input unit 412. In the present embodiment, touching to "Register" on touch panel 120 corresponds to the registration instruction. However, the registration instruction is not limited to this.

In step S2521, handwritten memo processor 446 acquires the display data of the screen displayed on display 130.

In step S2523, handwritten memo processor 446 acquires the current time from clock counter 420.

In step S2525, handwritten memo processor 446 adds the display data and the time acquired in steps S2521 and S2523 to handwritten memo data 182 in association with each other.

Second Embodiment

In the first embodiment, electronic device 100 returns to the initial screen of the application (the search screen in the dictionary application or the like) after the creation of the handwritten memo. In contrast, after the creation of the handwritten memo to the item of the content, electronic device 100 according to a second embodiment returns to the one-subject display screen displayed before the creation of the handwritten memo.

Figure 26:
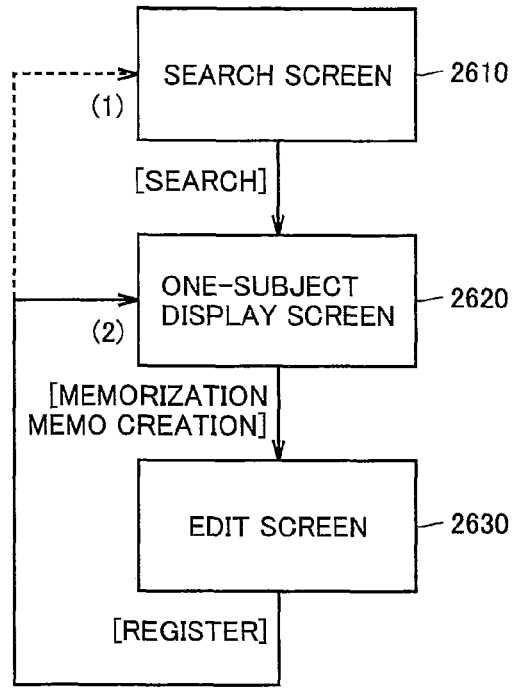
FIG. 26 is a diagram schematically showing screen transition according to the first embodiment and a second embodiment.

In FIG. 26, screen transition according to the first embodiment and the second embodiment is schematically shown. In the first embodiment, electronic device 100 first displays a search screen 2610, and shifts from search screen 2610 to a one-subject display screen 2620 in accordance with a search instruction. Furthermore, electronic device 100 shifts from one-subject display screen 2620 to an edit screen 2630 in accordance with a memorization memo creation instruction. Upon accepting a registration instruction during the display of edit screen 2630, electronic device 100 registers the screen in the handwritten memo data, and returns to search screen 2610. In contrast, in the second embodiment, although the operation up to the display of edit screen 2630 is common, upon accepting the registration instruction during the display of edit screen 2630, the screen is registered in the handwritten memo data, and returns to one-subject display screen 2620 instead of returning to search screen 2610.

In the first embodiment, when the registration instruction is given after shifting from the one-subject display screen to the edit screen, the one-subject display screen displayed before the display of the edit screen is not displayed, which causes a possibility that the user feels uncomfortable. In the present embodiment, such uncomfortable feelings can be eliminated.

Moreover, the user may want to review the one-subject display screen displayed before. Particularly, when the description screen is not displayed on display 130, the user may want to check the other portion of the one-subject display screen that he or she viewed previously. In the present embodiment, such needs of the user can be met.

Figure 27:
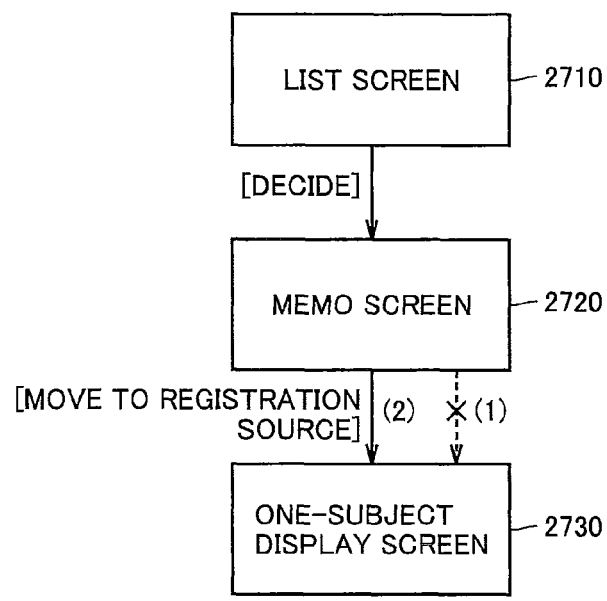
FIG. 27 is a diagram schematically showing operation of moving from a memo screen to the one-subject display screen of a registration source of the memo.

Furthermore, electronic device 100 according to second embodiment can move to the one-subject display screen of a registration source of the memo after the screen moves from the list screen to the screen with the handwriting superimposed (referred to as a memo screen). In FIG. 27, this operation is schematically shown. Upon accepting a decision instruction during the display of a list screen 2710, electronic device 100 moves to a memo screen 2720. Furthermore, upon accepting a predetermined instruction during the display of memo screen 2720, electronic device 100 moves to a one-subject display screen 2730, which is the registration source of the memo.

In this manner, according to electronic device 100 according to the second embodiment, the user can easily refer to the one-subject display screen of the registration source from the memo screen.

A hardware configuration and a functional configuration of electronic device 100 according to the second embodiment are almost similar to those of the first embodiment, and thus, a description thereof will not be repeated. However, processing contents that controller 440 performs are different. Hereinafter, processing that controller 440 according to the second embodiment performs will be described.

The processing of controller 440 in displaying the one-subject display screen is similar to the processing described with reference to FIG. 21 in the first embodiment, and thus, a description thereof will not be repeated.

Figure 28:
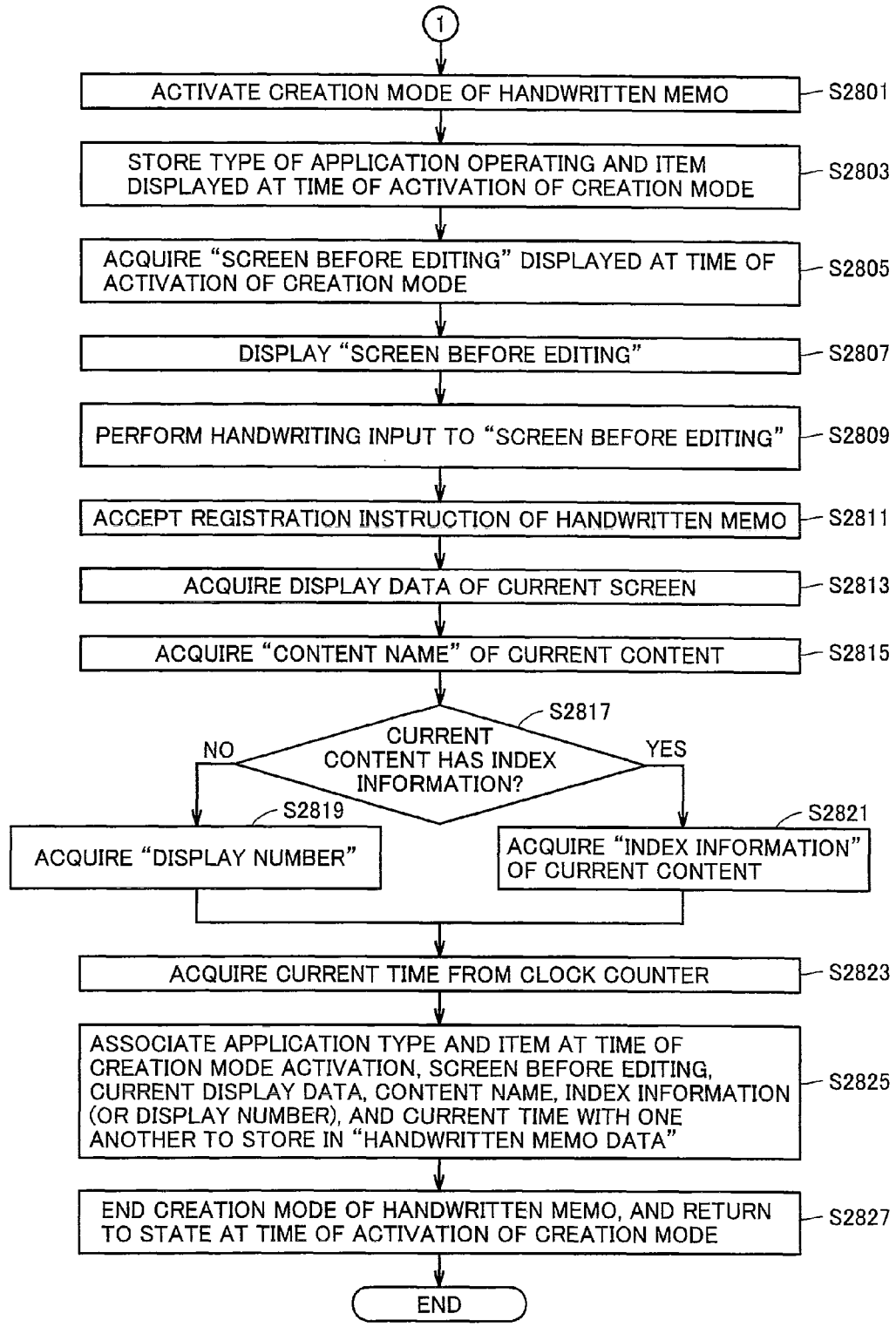
FIG. 28 is a diagram showing, in a flowchart form, a flow of processing that a handwriting processor according to the second embodiment performs in creating the handwritten memo.

Referring to FIG. 28, a flow of processing that handwritten memo processor 446 included in controller 440 performs in creating the handwritten memo will be described. FIG. 28 is a diagram showing, in a flowchart form, the flow of the processing that handwritten memo processor 446 according to the second embodiment performs in creating the handwritten memo. Hereinafter, points different from the processing described with reference to FIG. 22 in the first embodiment will be focused on and described.

In step S2801, handwritten memo processor 446 activates the creation mode of the handwritten memo.

In step S2803, handwritten memo processor 446 stores the type of the application operating at the time of activation of the creation mode and the displayed item in a predetermined storage region of storage 430. The present embodiment is different from the first embodiment in that the displayed item is also stored.

Processing from steps S2805 to S2823 is similar to the processing from steps S2205 to S2223 shown in FIG. 22, and thus, detailed descriptions thereof will not be repeated.

In step S2825, handwritten memo processor 446 associates the application type and the item at the time of activation of the handwritten memo creation mode, the screen before editing, the current display data, the content name, the index information (or display number) and the current time with one another, and stores the same in storage 430 as handwritten memo data 182. The present embodiment is different from the first embodiment in that the application type and the item acquired in step S2803 are also stored in handwritten memo data 182.

In step S2827, handwritten memo processor 446 ends the creation mode of the handwritten memo, and returns to the state at the time of activation of the creation mode of the handwritten memo, based on the application type and the time stored in step S2803.

Figure 29:
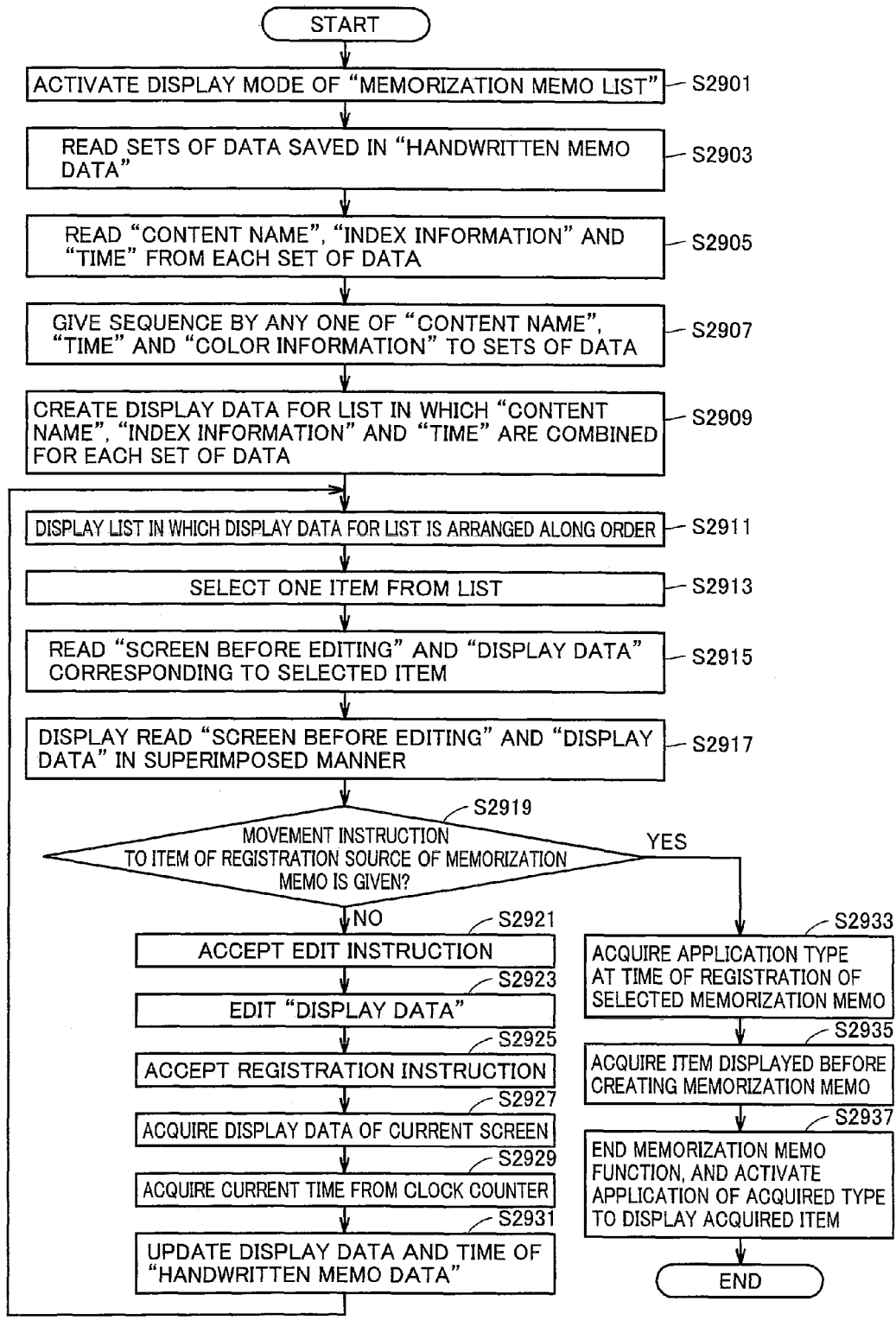
FIG. 29 is a diagram showing, in a flowchart form, a flow of processing that the handwriting processor according to the second embodiment performs in creating the handwritten memo.

Referring to FIG. 29, a flow of processing that handwritten memo processor 446 performs in list display and editing of the registered handwritten memos will be described. FIG. 29 is a diagram showing, in a flowchart form, the flow of the processing that handwritten memo processor 446 according to the second embodiment performs in creating the registered handwritten memos. Hereinafter, differences from the first embodiment will be focused on and described.

Processing from steps S2901 to S2917 is similar to the processing from steps S2301 to S2317 shown in FIG. 23, and thus, detailed descriptions thereof will not be repeated.

In step S2919, handwritten memo processor 446 determines whether or not a movement instruction to the item of the registration source of the memorization memo is given. Although not particularly illustrated, electronic device 100, for example, creates an area corresponding to this movement instruction on touch panel 120 and considers touching to this area to be the movement instruction.

If the movement instruction to the item is not given (NO in step S2919), handwritten memo processor 446 executes processing from steps S2921 to S2931 to return to processing in step S2911. The processing from steps S2921 to S2931 is similar to the processing from steps S2317 to steps S2329 in FIG. 23. This series of processing allows the handwritten memo to be edited and the handwritten memo after the editing to be registered.

When the movement instruction to the item is given (YES in step S2919), in step S2933, handwritten memo processor 446 acquires the application type at the time of registration of the selected memorization memo. That is, handwritten memo processor 446 acquires the application type at the time of activation of the creation mode, which is stored in handwritten memo data 182 in step S2825 in FIG. 28.

In step S2935, handwritten memo processor 446 acquires the item displayed before the creation of the memorization memo. That is, handwritten memo processor 446 acquires the item at the time of activation of the creation mode, which is stored in handwritten memo data 182 in step S2825 in FIG. 28.

In step S2937, handwritten memo processor 446 ends the memorization memo function, and activates the application of the type acquired in step S2933 to cause display 130 to display the one-subject display screen of the item acquired in step S2825.

Third Embodiment

In a third embodiment, electronic device 100 that manages the handwriting input on the basis of color will be described. A hardware configuration and a functional configuration of electronic device 100 according to the third embodiment are almost similar to those of the first embodiment or the second embodiment, and thus, descriptions thereof will not be repeated. Processing contents that controller 440 performs will be now described.

Processing of controller 440 in displaying the one-subject display screen is similar to the processing described with reference to FIG. 21 in the first embodiment, and thus, a description thereof will not be repeated.

Figure 30:
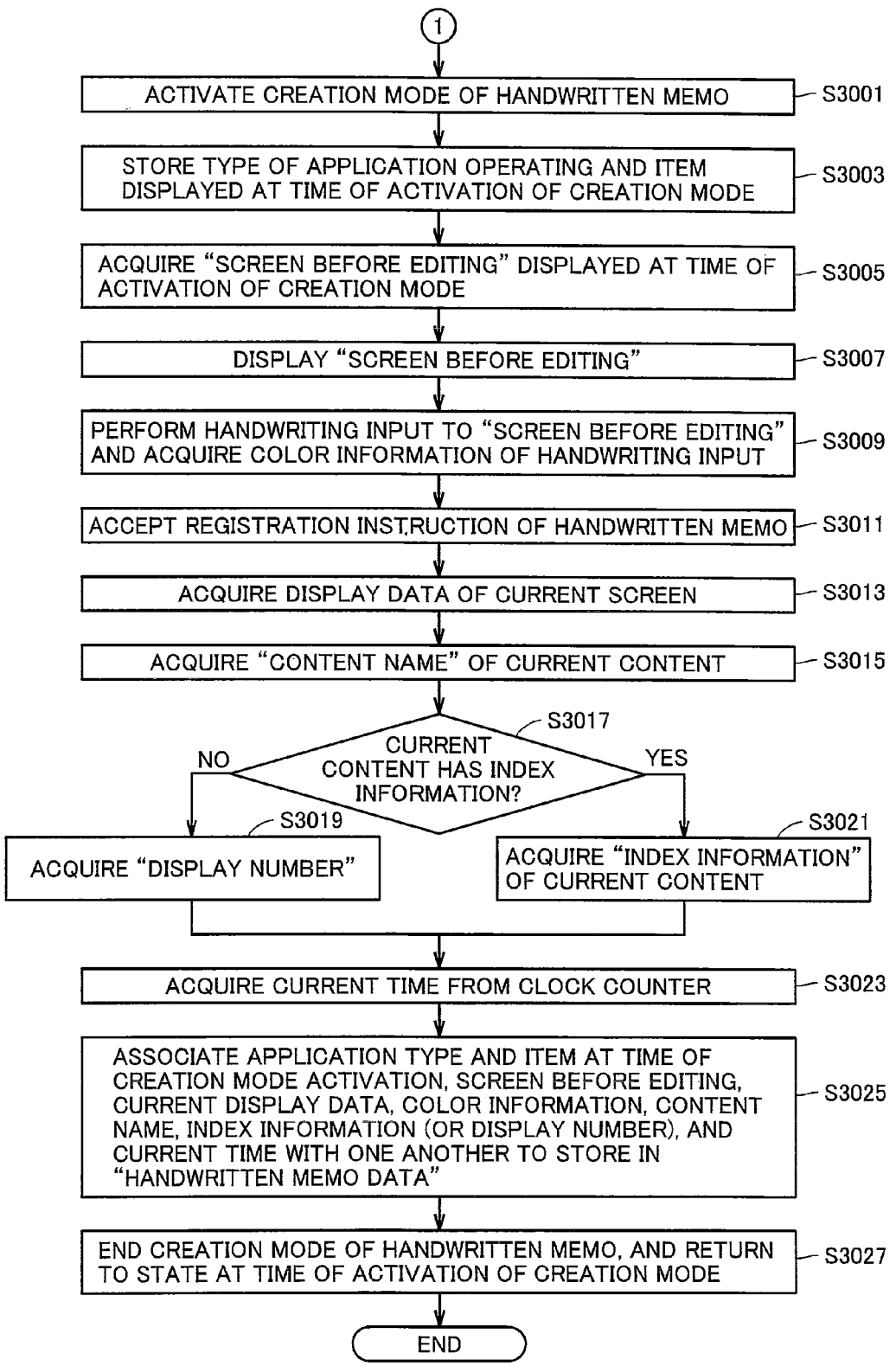
FIG. 30 is a diagram showing, in a flowchart form, a flow of processing that a handwriting processor according to a third embodiment performs in creating the handwritten memo.

Referring to FIG. 30, a flow of processing that handwritten memo processor 446 included in controller 440 performs in creating the handwritten memo will be described. FIG. 30 is a diagram showing, in a flowchart form, the flow of the processing that handwritten memo processor 446 according to the third embodiment performs in creating the handwritten memo.

Handwritten memo processor 446 according to the third embodiment performs color management in addition to the processing that handwritten memo processor 446 according to the second embodiment performs. Hereinafter, different points from the processing described with reference to FIG. 28 in the second embodiment will be focused on and described.

Processing from steps S3001 to S3007 is similar to the processing from steps S2801 to steps S2807 in FIG. 28, and thus, descriptions thereof will not be repeated.

In step S3009, handwritten memo processor 446 performs handwriting input to the screen before editing. At this time, handwritten memo processor 446 acquires color information of the performed handwriting input, and stores the acquired color information in a predetermined storage region of storage 430. This point is different from the second embodiment. For example, when the handwriting input is performed in red and blue, handwritten memo processor 446 stores "red" and "blue" in storage 430 as color information.

Processing from steps S3011 to S3023 is similar to the processing from steps S2811 to S2823 in FIG. 28, and thus, descriptions thereof will not be repeated.

In step S3025, handwritten memo processor 446 associates the application type and the item at the time of activation of handwritten memo creation mode, the screen before editing, the current display data, the color information, the content name, the index information (or the display number) and the current time with one another, and stores the same in storage 430 as handwritten memo data 182. The present embodiment is different from the second embodiment in that the color information acquired in step S3009 is also stored in handwritten memo data 182.

In step S3027, handwritten memo processor 446 ends the creation mode of the handwritten memo, and returns to the state at the time of activation of the creation mode of the handwritten memo, based on the application type and the item stored in step S2803.

Figure 31:
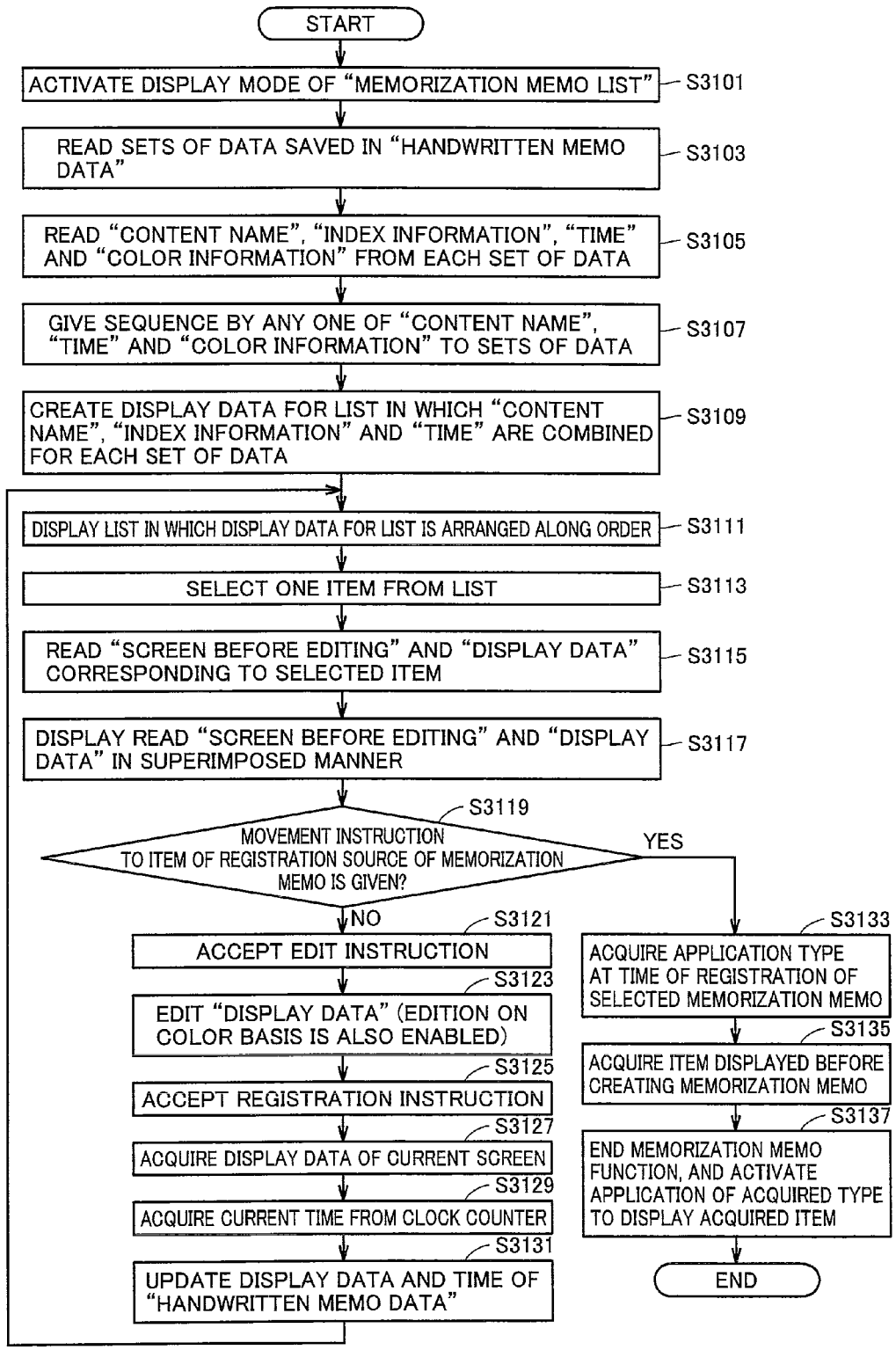
FIG. 31 is a diagram showing, in a flowchart form, a flow of processing that the handwriting processor according to the third embodiment performs in creating the registered handwritten memo.

Referring to FIG. 31, a flow of processing that handwritten memo processor 446 performs in list display and editing of the registered handwritten memos will be described. FIG. 31 is a diagram showing, in a flowchart form, the flow of the processing that handwritten memo processor 446 according to the third embodiment performs in creating the registered handwritten memos. Differences from the second embodiment will be focused on and described.

In step S3101, handwritten memo processor 446 activates the display mode of the memorization memo list in accordance with an instruction accepted by input unit 412.

In step S3103, handwritten memo processor 446 reads the sets of data saved in handwritten memo data 182 and associated with one another, respectively.

In step S3105, handwritten memo processor 446 reads the "content name", the "index information", the "time", and the "color information" from each of the sets of data, and temporarily stores the same in association with the identification information of the set of data in storage 430 (preferably, in RAM 160 with a fast readout speed).

In step S3107, handwritten memo processor 446 gives a sequence by any one of the "content name", the "time" and the "color information" to the respective sets of data, based on the read content names, times and color information. Which sequence handwritten memo processor 446 gives can be set by the user.

In the case where the user uses the colors of the handwriting input in accordance with importance of writing, handwritten memo processor 446 can perform the list display of the handwritten memos in the order of importance by rearranging the sets of data based on the color information.

It is preferable that how the sets of data are rearranged based on the colors can be set by the user. For example, if the user performs important writing in "red", setting may be made so as to preferentially display the sets of data having "red" as the color information.

However, a rearrangement rule may be set in advance. For example, in the case of setting of preferentially displaying the sets of data including "blue", the user may perform important writing in blue.

Processing from steps S3109 to S3119 is similar to the processing from steps S2909 to S2910 described with reference to FIG. 29 in the second embodiment, and thus, detailed descriptions thereof will not be repeated.

If the movement instruction to the item is not given (NO in step S3119), handwritten memo processor 446 executes processing from steps S3121 to S3131, and returns to processing in step S3111. The processing from steps S3121 to S3131 is almost similar to the processing from steps S2921 to step S2931 in FIG. 29. This series of processing allows the handwritten memo to be edited, and the memo after the editing to be registered.

However, in step S3123, handwritten memo processor 446 may be able to edit the display data on the basis of color. For example, handwritten memo processor 446 may perform processing of deleting only a specific color. At this time, handwritten memo processor 446 specifically extracts pixels in the specified color, based on color data of respective pixels of the display data, and makes the extracted pixels transparent.

Moreover, in step S3123, handwritten memo processor 446 stores the color information after the editing of the display data in storage 430. For example, handwritten memo processor 446 changes the color information when handwriting input in a new color is performed, or when a color of handwriting input already performed is deleted.

In the case where the color information is changed, handwritten memo processor 446 changes the color information of handwritten memo data 182 when overwriting processing of the handwritten memo is performed in step S3131. Moreover, when the new registration of the handwritten memo is performed, handwritten memo processor 446 newly registers, in handwritten memo data 182, the color information stored in storage 430 in step S3123.

If the movement instruction to the item is given (YES in step S3119), handwritten memo processor 446 executes processing from steps S3133 to S3137. The processing from steps S3133 to S3137 is almost similar to the processing from steps S2933 to S2937 in FIG. 29. This series of processing allows handwritten memo processor 446 to end the memorization memo function, and causes display 130 to display the one-subject display screen corresponding to the displayed memorization memo.

[Others]

Appropriate combinations of the respective embodiments can be considered to be embodiments of the present invention. For example, an electronic device in which the color management function described in the third embodiment is added to electronic device 100 according to the first embodiment can be also considered to be one embodiment of the present invention.

Moreover, electronic device 100 may be able to pass handwritten memo data 182 to another device, or may be able to receive handwritten memo data 182 from another device. The above-described configuration enables a plurality of devices to utilize common handwritten memo data 182.

The embodiments disclosed here should be considered to be illustrative, and not limitative in every respect. It is intended that the scope of the present invention is presented not by the foregoing description but by the scope of claims, and that meanings equivalent to the scope of claims and all modifications within the scope are included.

REFERENCE SIGNS LIST

100 electronic device, 110 input key, 120 touch panel, 130 display, 132 display controller, 140 speaker, 142 voice controller, 172 content database, 173 searching database, 174 description database, 175 index database, 176 content name database, 180 hard disk, 182 handwritten memo data, 210 first casing, 220 second casing, 230 stylus pen, 300 power key, 302 character key, 304 direction key, 306 decision key, 308 return key, 310 clear key, 312 backspace key, 316 movement key, 318 voice key, 320 volume key, 322 character size key, 330 memorization memo key, 340 preview key, 350 switching key, 410 input and output key, 412 input unit, 413 key input unit, 414 handwriting input unit, 416 display unit, 420 clock counter, 430 storage, 432 display data, 440 controller, 441 key input accepting unit, 442 handwriting input accepting unit, 443 content display processor, 444 content search processor, 445 time management processor, 446 handwritten memo processor

The invention claimed is:

1. An electronic device comprising:

a display; and an input unit for accepting an external instruction, said input unit including a handwriting input unit for accepting handwriting input, said electronic device comprising:

a storage for storing a content including a plurality of items;

a first processing unit for searching an item of said plurality of items based on said instruction;

said first processing unit causing said display to display an item display screen based on said searched item;

said electronic device further comprising:

a second processing unit for causing said display to display handwritten expression corresponding to said handwriting input so as to superimpose said handwritten expression on said item display screen, said second processing unit storing said handwritten expression in said storage in association with identification information of said item corresponding to said item display screen on which said handwritten expression is superimposed, causing said display to selectably display said identification information corresponding to said handwritten expression, and causing said display to display said item display screen corresponding to selected identification information, and said handwritten expression stored in said storage, when said identification information is selected, based on said instruction.

2. The electronic device according to claim 1, wherein:
upon accepting said instruction to store said handwritten expression in said storage, said second processing unit captures a screen displayed on said display, and stores said captured screen in said storage, and
causes said display to display said captured screen when said identification information is selected.

3. The electronic device according to claim 2, wherein
said second processing unit causes said display to fixedly display said item display screen while said handwritten expression is displayed on said display.

4. The electronic device according to claim 2, wherein:
said second processing unit further stores said item display screen in said storage in association with said searched item at said time of accepting said instruction,
causes said display to display said captured screen and said item display screen in a superposed manner, when said identification information is selected, and
edits said captured screen, based on said instruction.

5. The electronic device according to claim 1, wherein
said identification information includes an index given to said item.

6. The electronic device according to claim 1, wherein
said identification information includes a content name given to said content including said item.

7. The electronic device according to claim 1, further comprising
a clock unit for measuring a time, wherein
said second processing unit stores said time as said identification information in said storage in storing said handwritten expression in said storage.

8. The electronic device according to claim 1, wherein
said second processing unit causes said display to display a preview of said handwritten expression in association with said identification information associated with said handwritten expression.

9. The electronic device according to claim 1, wherein:
said second processing unit stores a color of said handwritten expression in said storage as said identification information when storing said handwritten expression in said storage.

10. The electronic device according to claim 9, wherein:
said second processing unit sorts a plurality of said handwritten expressions on the basis of said colors, and causes a list of said handwritten expressions to be displayed in an order of the sort.

11. The electronic device according to claim 1, wherein:
said electronic device is an electronic dictionary,
said item is an index word, and
said item display screen is a screen that displays description information of said index word.

12. An information processing method using an electronic device having a display, a handwriting input unit for accepting handwriting input, a storage for storing a content including a plurality of items, and an arithmetic unit, said method comprising the steps of:
causing said arithmetic unit to search an item of said plurality of items;
causing said display to display an item display screen based on said searched item;
causing said display to display handwritten expression corresponding to said handwriting input so as to superimpose said handwritten expression on said item display screen;
storing said handwritten expression in said storage in association with identification information of said item corresponding to said item display screen on which said handwritten expression is superimposed;
causing said display to selectably display said identification information associated with said handwritten expression; and
displaying, on said display, said item display screen corresponding to said selected identification information, and said handwritten expression stored in said storage, when said identification information is selected, based on said instruction.

* * * * *